US012088139B2

(12) United States Patent
Livingston

(10) Patent No.: US 12,088,139 B2
(45) Date of Patent: Sep. 10, 2024

(54) MODULARIZED ESS AND POWER DISTRIBUTION SYSTEM

(71) Applicant: Joule Case Inc., Seattle, WA (US)

(72) Inventor: Alexander Livingston, Seattle, WA (US)

( * ) Notice: Subject to any disclaimer, the term of this patent is extended or adjusted under 35 U.S.C. 154(b) by 0 days.

(21) Appl. No.: 18/240,826

(22) Filed: Aug. 31, 2023

(65) Prior Publication Data

US 2024/0250555 A1 Jul. 25, 2024

Related U.S. Application Data

(63) Continuation of application No. 17/671,152, filed on Feb. 14, 2022, now Pat. No. 11,750,024, which is a continuation of application No. 17/069,783, filed on Oct. 13, 2020, now Pat. No. 11,251,649.

(60) Provisional application No. 62/913,349, filed on Oct. 10, 2019.

(51) Int. Cl.
*H02J 9/06* (2006.01)
*H02J 3/38* (2006.01)

(52) U.S. Cl.
CPC ................ *H02J 9/06* (2013.01); *H02J 3/381* (2013.01); *H02J 2300/24* (2020.01); *H02J 2300/28* (2020.01)

(58) Field of Classification Search
CPC ...... H02J 9/06; H02J 3/38; H02J 3/381; H02J 2300/28; H02J 2300/24
See application file for complete search history.

(56) References Cited

U.S. PATENT DOCUMENTS 11,251,649 B2 2/2022 Livingston
2017/0346322 A1 11/2017 Kuran et al.

*Primary Examiner* — Robert L Deberadinis
(74) *Attorney, Agent, or Firm* — FisherBroyles LLP; Bryan A. Santarelli

(57) ABSTRACT

A system employing a modular containerized energy-storage systems (ESS) and power cabinet control system allows for long duration uninterruptible power supply (UPS) capabilities for battery and electrochemical storage devices. modular containerized ESS and power cabinet control system. Long duration uninterruptible power supply (UPS) capabilities for battery and electrochemical storage devices may be realized. Embodiments of a modularized energy storage system can comprise a first power cabinet configured to function as a primary power and load balancing appliance. The first power cabinet can comprises power electronics including a DC-AC inverter, transformer, and frequency regulator; a set of one or more energy storage systems, which may be battery-based.

27 Claims, 22 Drawing Sheets

MODULARIZED ESS AND POWER DISTRIBUTION SYSTEM

This application is a continuation of U.S. application Ser. No. 17/671,152 filed Feb. 14, 2022, which is a continuation of U.S. application Ser. No. 17/069,783 filed Oct. 13, 2020, which claims the benefit of U.S. Application No. 62/913,349 filed Oct. 10, 2019, which applications are incorporated by reference as if fully set forth herein.

TECHNICAL FIELD

This disclosure relates generally to electrical power systems, and more particularly to mobile and sited commercial and industrial scale power generation, capture and storage systems. These are generally referred to as electrical storage systems, ESS, and may be battery-based energy storage systems.

BACKGROUND

Mobile and sited commercial and industrial scale power generation, and capture and storage systems are generally constructed to provide a means to transform stored energy into power. Such energies are most commonly is a combustion fuel source. This is often done to provide backup, emergency or uninterruptible power supply (UPS) to a large power source within a building, an entire building or group of buildings, structures and appliances within a defined area. Typically, these systems can add combustion fuel to increase their operation time if required. Such systems are usually set for the range of power they can provide and are built with a range or power output and energy storage (the tank or reservoir) and are commonly built as one unit. It would not be feasible nor practical in the prior embodiments to separate the power production device from the energy storage device.

Another common issue with traditional combustion UPS systems is maintaining power load balancing. Typically, these large power systems connect to a facility that has been load balanced. However, if it is being deployed in an area without proper load balancing, noise can occur in the power generation for 3-phase AC motors. Superior load isolation can be achieved with dedicated power production circuits.

Massive power fluctuation can also be problematic for these traditional motor/engine-based systems. If the spike is tenths of hundredths of a second or less, it may not be possible for the rotation of the motor relative to the leg of the 3-phase line to catch up and may result in total system failure. Electronic based UPS systems can have a much faster response time. The application may be a set of high-power strobe lights that flash once for only two (2) milliseconds and would not create enough duration for a typical generator to catch up. This causes problems with other devices, and does not provide enough power for the strobe, starving it and potentially causing damage to the device.

SUMMARY

The present invention discloses systems and method related to deploying a modular containerized ESS and power cabinet control system. The inventive system allows for long duration uninterruptible power supply (UPS) capabilities for battery and electrochemical storage devices.

In embodiments, a modularized energy storage system comprises a power cabinet comprising an internal energy storage and an interface to connect to one or more power sources. The power cabinet can be configured to function as a primary power and load balancing appliance, wherein the first power cabinet comprises power electronics including a DC-AC inverter, transformer, frequency regulator, and a plurality of inputs. The modularized energy storage system may further comprise a set of battery-based energy storage systems connected to the first power cabinet. The first power cabinet can receive multiple energy inputs, provides multi-phase output voltages, and can energize and de-energize one or more inputs while energizing or having already energized one or more outputs.

In embodiments, a plurality of power sources can be linked and connected to the first power cabinet. A second power cabinet can configured connect to the first power cabinet; and a third power cabinet configured to be connected to the first power cabinet; wherein the first power cabinet provides multi-phase output voltages to the second and third power cabinets.

In another embodiment, a modularized energy system can comprise a plurality of power cabinets. A first power can be configured to function as a primary power and load balancing appliance and may comprise power electronics including a DC-AC inverter, transformer, and frequency regulator. Additional power cabinets can be added to the system as well, such as a second or third power cabinet. The modularized energy system can further comprise a set of battery-based energy storage systems (BESS) connected to the first power cabinet. Means for connecting the first power cabinet to the second, third, or additional power cabinets can be used to enable the first power cabinet to energize any or all of the other power cabinets, e.g., the second and third power cabinets. The first power cabinet can further provide multi-phase output voltages to the second and third power cabinets.

In embodiments, power electronics in the first power cabinet can be configured on isolated circuits. Such isolated circuits can reduce the need for balancing legs of 3-phase power distribution, as discussed herein. Power electronics may further include means for shielding the isolated circuits from electrical noise. Moreover, the individual ESS can be connected to and disconnected from the first power cabinet while the first power cabinet is providing output power any or all of the additional power cabinets.

In some embodiments, the first power cabinet further comprises an independent energy supply suitable for short duration power and energy supply. the first power cabinet further comprises a combustion fuel system. The first power cabinet can also comprise a variety of voltage and power conversion circuits allowing for fewer transformers to be used in connected power cabinets. Accordingly, power electronics can also be configured on isolated circuits that reduce the need for balancing legs of 3-phase power distribution and may include means for shielding the isolated circuits from electrical noise.

In various embodiments, the second and third power cabinets, or any number of additional power cabinets can be contained inside a common housing. In an example, the first power cabinet and set of ESS are configured for transportation on a mobile trailer. In additional embodiments, individual ESS can be connected to and disconnected from the first power cabinet while the first power cabinet is providing output power to the second and third power cabinets.

DETAILED DESCRIPTION OF ILLUSTRATIVE EMBODIMENTS

With the technological improvements and reduction in price for advanced battery and other electro-chemical storage systems, it is possible to construct a fully battery-based containerized UPS or ESS. However, due to the limitations of the amount of stored energy, the typical topology of containerized UPS and ESS designs restrict this technology to short duration power events. What is needed is a method to separate the power generation portion of the containerized UPS and ESS design. allowing it to be coupled and decoupled from multiple energy storage specific containers. This design more closely resembles adding combustion fuel to the tank of traditional UPS containerized systems.

The architecture of the disclosed systems and methods, including the Mobile ESS with Power Cabinet, Energy Enclosures and modular energy devices lays out a system that can replace fossil fuels in traditional temporary power, stationary backup, transportation large and small, auxiliary device power and more.

The architecture of the power appliance must therefore be capable of accepting multiple inputs, allowing for these circuits to become energized and de-energized and for an empty container to be exchanged for another while maintaining power continuity. The present disclosure relates to a system comprised of a main power container that may connect to a plurality of energy containers, including but not limited to a traditional combustion fuel system, if needed.

Accordingly, the systems and methods herein are able to connect energy storage containers to energy capture and power production sites, such as solar or wind farms for example. Embodiments include systems and methods for transporting energy storage containers that may contain a plurality of modular battery packs that can further reduce the granularity of mobile distributed power. Energy storage containers can connect to utility scale sub-stations or other industrial and commercial grade power production, distribution and transmission installations, and can provide peaking power resources for utility and commercial scale grid systems that may utilize non-desirable energy production.

Additional features and advantages of disclosed systems and methods include time-shifting of energy capture and generation enables intermittent renewable energy systems to more effectively participate in the power fluctuation and demand side management of a utility system. Energy can be captured, transported and distributed to a system without infrastructure or whose infrastructure is not sufficient or has encountered a problem, and in particular, stored contents of a large containerized ESS can be distributed to smaller power needs that may be distributed over a wide area. In addition, smaller energy storage systems can be integrated into a larger collective containerized ESS that can provide greater collective power output.

Figure 1:
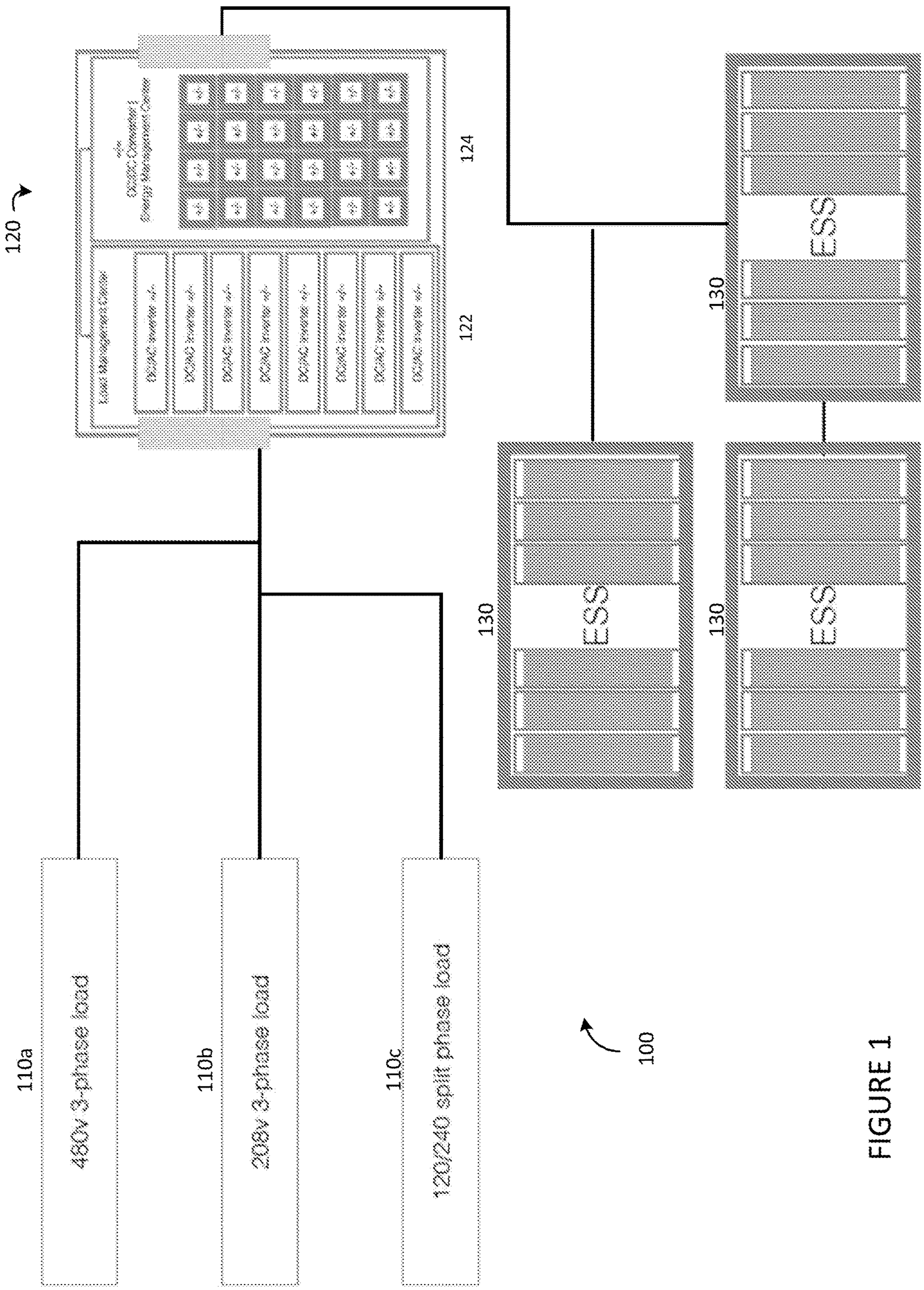
FIG. 1 illustrates an arrangement comprising multiple ESS connected to a singular power cabinet.

FIG. 1 depicts a collection of energy storage system containers 130 that have been connected or coupled in a common manner to an independent Power Cabinet 120. Inside the power cabinet 120, there are common voltage combination devices such as DC-AC inverters, transformers, DC/DC converters, frequency regulators, a load management center 122, an energy management center 124 and other power equipment commonly used in power conversion. The power cabinet contain voltage and power conversion lines that connect to additional power sources, such as ESS 130, which can contain one or more power cell modules, blades of power cell modules, be connected to an independent power supply, external power supply, and the like.

The power cabinet is cable of receiving multiple energy inputs and capable of providing multiple output voltages including but not limited to 110, 200, 208, 220, 240, 300, 380, 400 and 480 v, in various frequencies and phases as required. In embodiments, the power cabinet capable of energizing and de-energizing one or more inputs while energizing or having already energized one or more other inputs. Moreover, by having its own internal energy storage allowing it to operate for some length of time without the addition of energy storage containers.

In the depicted embodiment the power cabinet 120 connect to ESS and external devices via voltage and power conversion lines. As such, there may be internal or external physical interface to connect one or more inputs from various sources, and various power outputs that can provide dedicated and optionally line-isolated voltages and frequencies as needed. The lines may comprise any of a plurality of voltage and connection specifications, and manage various loads 110. In embodiments, the power cabinet 120 can manage a 480 v, 3-phase load 110*a*, a 208 v 3-phase load 110*b* and a 120/240 v split phase load 110*c*. Such power conversion and voltage lines may be modified in accordance with embodiments, in order to address the power needs of the system 100 and be compatible with one or more power cabinets 120, ESS, including battery-based ESS, and any additional power sources and components which may be present.

In additional embodiments, the power cabinet 120 can further also contain an independent energy supply that may be suitable for several minutes or otherwise short duration power and energy supply, much like a typical uninterruptible power supply (UPS). The power cabinet may be capable or energizing or de-energizing various inputs from ESS/BESS or other energy sources, allowing the power cabinet to function as the primary power and load balancing appliance. These inputs can be DC or AC, in one embodiment one can imagine mechanical inputs driven into a motor or flywheel that is used to transfer and balance various energy inputs.

Multiple voltage and power conversion lines can be implemented allow for fewer transformers to be used further down the line. The power electronics in a power cabinet can be on isolated circuits which eliminate or greatly reduce the issue of 'balancing' the legs of 3-phase power distribution. There may be noise in the signal on lines due to the fields created but these can be further reduced by shielding the lines. The smaller or specific power cabinets pictured can be reconfigurable and contained inside one device.

In embodiments, the power cabinet can be controlled with a computer interface allowing the user to select the inputs and outputs of the system. The system is therefore capable of reconfiguring power output and input parameters as defined by the user or auto-detected based on a defined set of known or possible applications.

Power cabinet and BESS arrangements can be staggered or placed to suit a particular venue or site. As such, configurations are not limited to the illustrated embodiments. A power cabinet 120 can be capable of outputting multiple voltages within one cabinet. The power cabinet can further utilized isolated circuits, as discussed herein, provide different voltages without the use of step-down transformers in the field.

Figure 2:
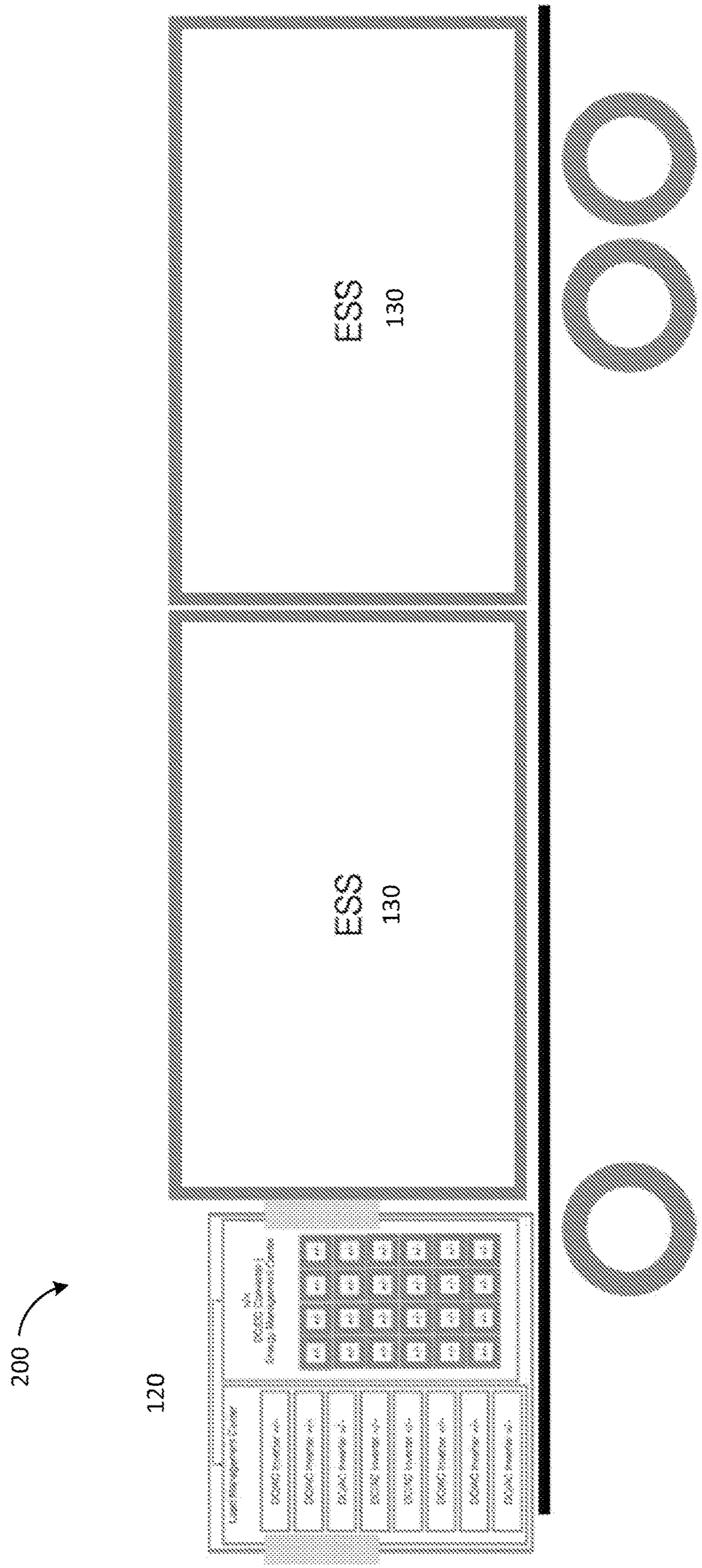
FIG. 2 illustrates an arrangement of a power cabinet and ESS containers on a mobile transport system.

FIG. 2 shows how power cabinets and ESS systems can be mobilized applied to transport systems. The depicted configuration 200 illustrates an arrangement wherein a power cabinet 120 and two energy storage system (ESS) 130 containers and placed on a mobile vehicle 210. It is also possible to mobilize the initial set of power cabinets, and then swap ESS/BESS systems in a method similar to how traditional combustion generators add fuel. In FIG. 2, the mobile vehicle 210 may be a 50' long bed trailer carrying a power cabinet which, in one embodiment, may be 10' in length while also carrying two 20' ESS or BESS containers.

In this type of arrangement, portability of the system may be realized, and can be implemented on existing transportation and mobile systems. It will be appreciated that the mobile transport systems on which embodiments may be applied are not limited to trucks and trailers, but can also be applied to additional vehicles and systems, such as trains, automobiles, transport vehicles, air transport, boats, ships, water transports, and the like. In addition, it will be appreciated that the number of power cabinets 120, ESS 130 and/or BESS may be changed depending on the desired power configurations or requirements of the system, physical constraints or limitations, and other variables.

FIGS. 3-7 illustrate various ESS configurations that are achievable with the technology discussed herein. It will be appreciated that ESS and BESS may be used interchangeably in such configurations, and the energy storage systems can have various power levels, capacities, may be the same or different, all within the scope of this disclosure.

Figure 3:
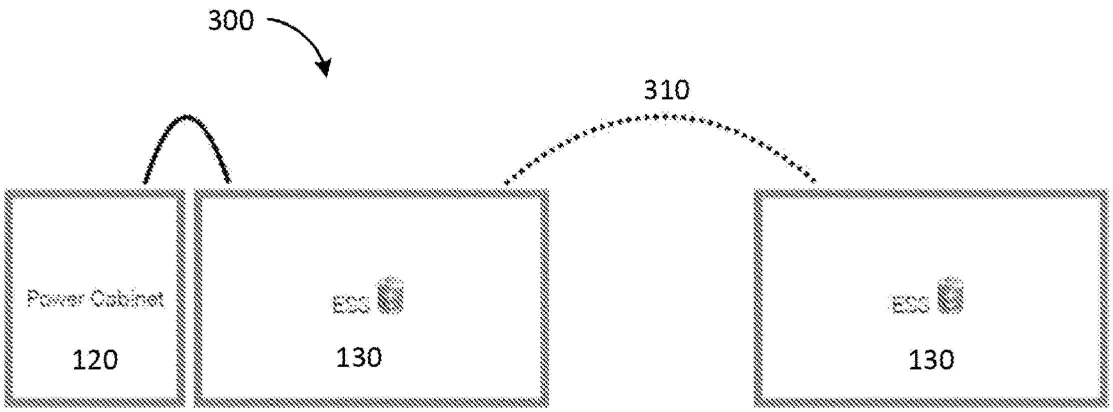
FIG. 3 depicts a power cabinet connected a single ESS container showing the system capability to add or remove additional ESS containers.

The configuration illustrated in FIG. 3 is a system 300 comprising a power cabinet 120 connected a single ESS container 140, and with capability to add or remove one or more additional ESS containers 130. Each ESS container is charged in this illustration. In embodiments, the power cabinet 120 can be placed temporarily, semi-temporarily, or permanently with one or more ESS or BESS units attached, as indicated by connection 310. Each BESS or ESS in the system is also capable of being 'chained' together or otherwise electrically linked, coupled or decoupled as needed.

Figure 4:
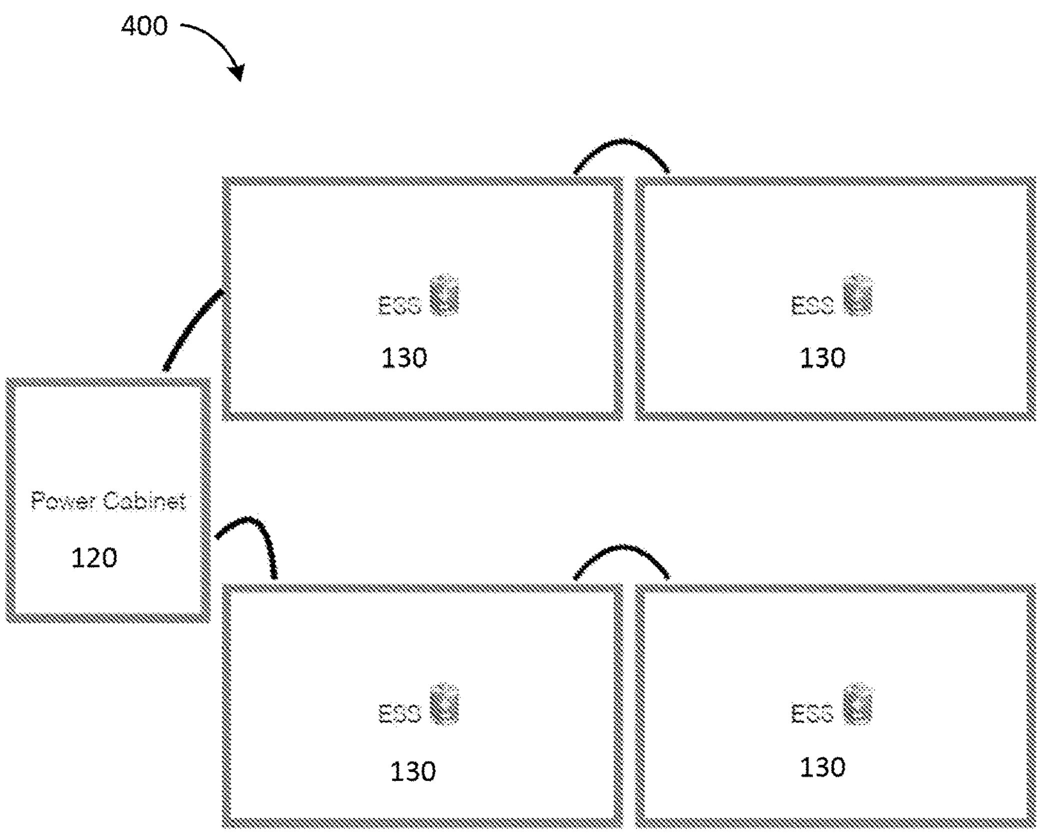
FIG. 4 depicts multiple strings of ESS containers in pairs connecting to a single power cabinet.

FIG. 4 shows another example configuration 400 of chained energy storage system containers. In this example, multiple chains of a plurality of ESS containers 130 can be coupled to the power cabinet 120, with each connected chain of ESS units able to provide energy or collect and store energy. Each ESS in this example is fully charged, however, each ESS or BESS in this configuration may have different power levels.

Figure 5:
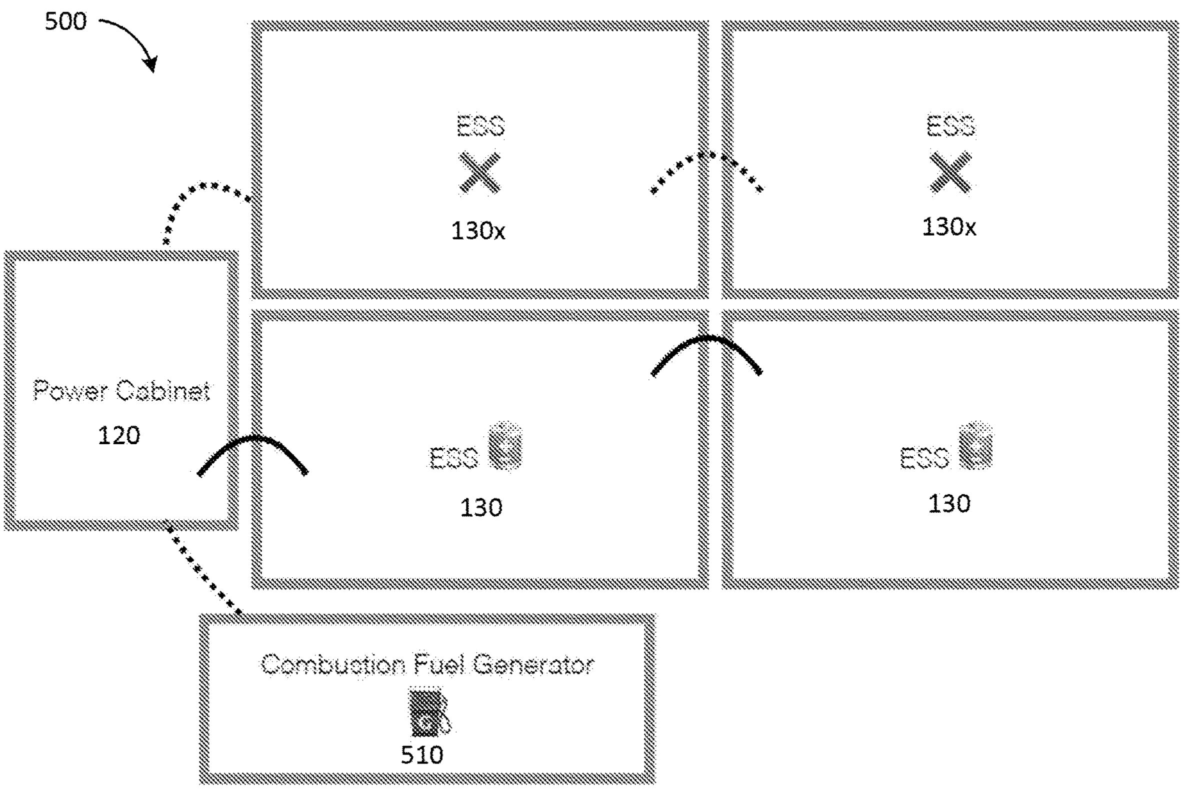
FIG. 5 depicts multiple ESS that may use different fuel sources connected and disconnected to a power cabinet. In this illustration a depleted ESS can be disconnected from the power cabinet and a charged ESS connected. The illustration also depicts a traditional combustion fuel ESS that has the ability to connect or disconnect from the power cabinet.

In the configuration 500 of FIG. 5, a variety of types of power sources, including sources with varying power levels can be selectively connected to the power cabinet. In the example, three different energy and power sources can be connected to a single power cabinet 120, and in embodiments, the power cabinet 120 can be connected to multiple power cabinets. Here, the power cabinet is connected to a first chain comprising 2 energy-depleted ESS cabinets 130*x*. The second chain comprises two charged ESS cabinets 130. The third source is a combustion fuel generator 510. In these embodiments, where multiple power sources are connected to a power cabinet, 120, it is also possible to select from which source to draw power.

In an example, if the first chain or coupling of ESS units have been depleted, like ESS 130*x*, the power cabinet can then begin to draw from the next ESS 130, or other connected device or power source, such as combustion fuel generator 510. A traditional combustion system that can also be used to hybridize the system. In embodiments, the traditional combustion system can be used to supplement, recharge or provide the primary power source to a power cabinet for any desired duration. In this approach it is easier to optimize the traditional combustion generator's output to maximize the total energy it produces.

Figure 6:
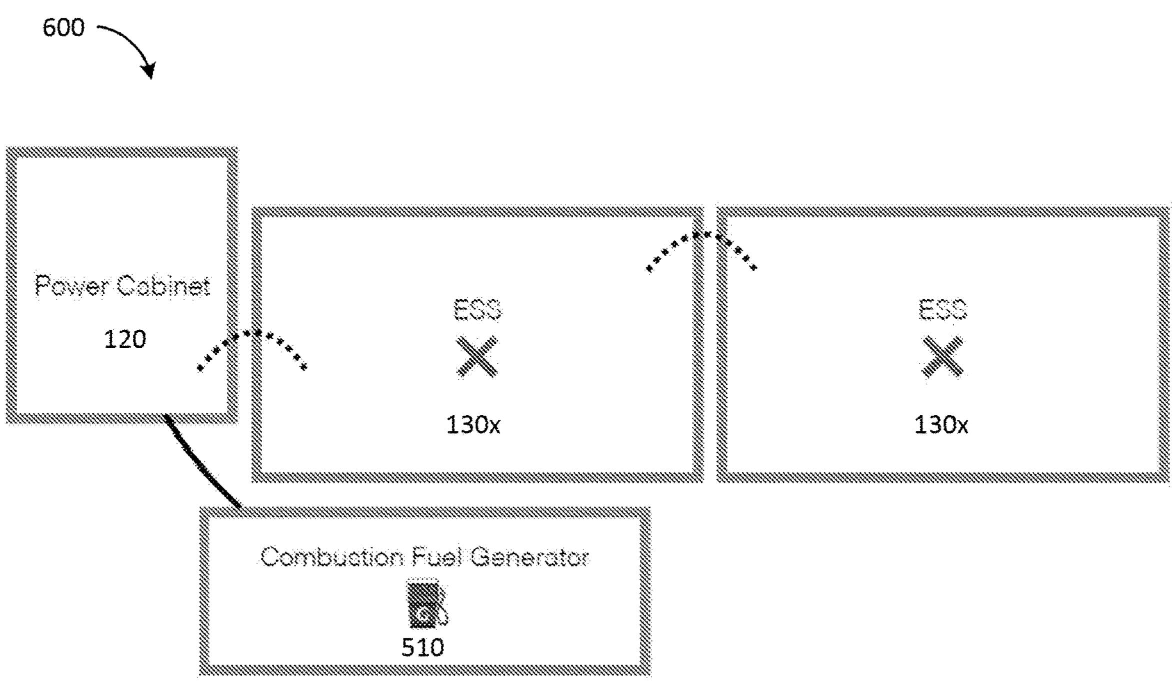
FIG. 6 depicts a depleted ESS disconnected from the power cabinet and a traditional combustion fuel ESS is connected and providing power to the power cabinet.

As illustrated in the system 600 of FIG. 6, a depleted ESS power source can transition to recharge from another location. A traditional combustion fuel system 510 can take over the power production for a short duration or until a recharged ESS can be returned. In such examples, power delivery is configured to be seamless and uninterruptible, so that there is no delay or noticeable absence of power when transitioning between power sources. In embodiments, the depleted ESS cabinets 130*x* may be recharged while a secondary power source, e.g., combustion fuel generator 510, is delivering power, and vice versa. As such, various power configurations may be realized, and can provide a versatile system that is able to be integrated with and applied to existing power systems and applications.

Figure 7A:
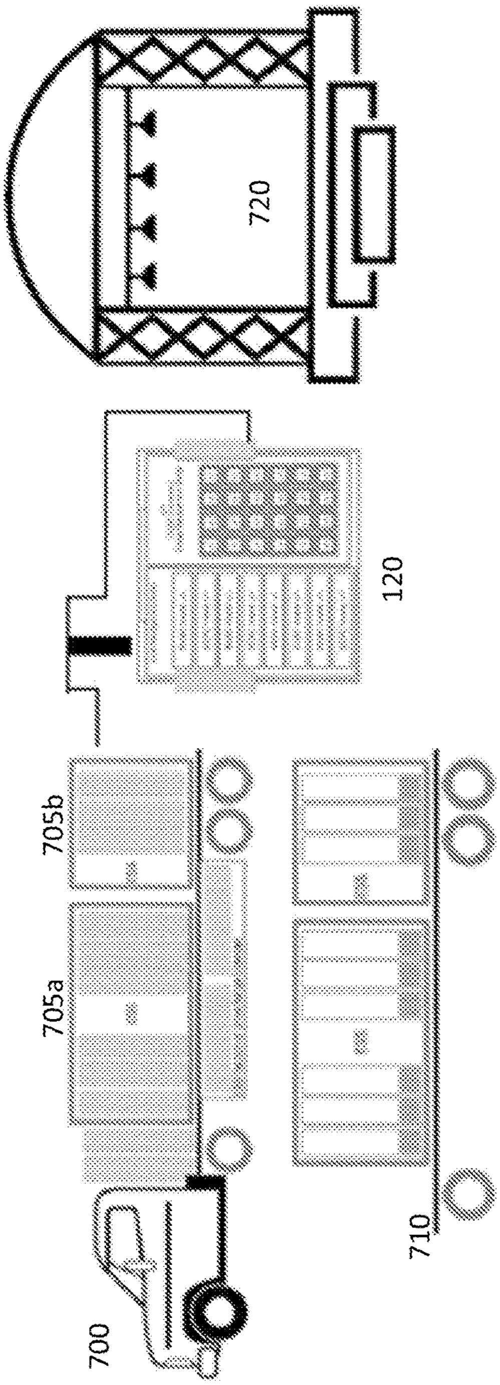
FIG. 7A depicts an application of a power cabinet and ESS arrangement to power a concert venue.
Figure 7B:
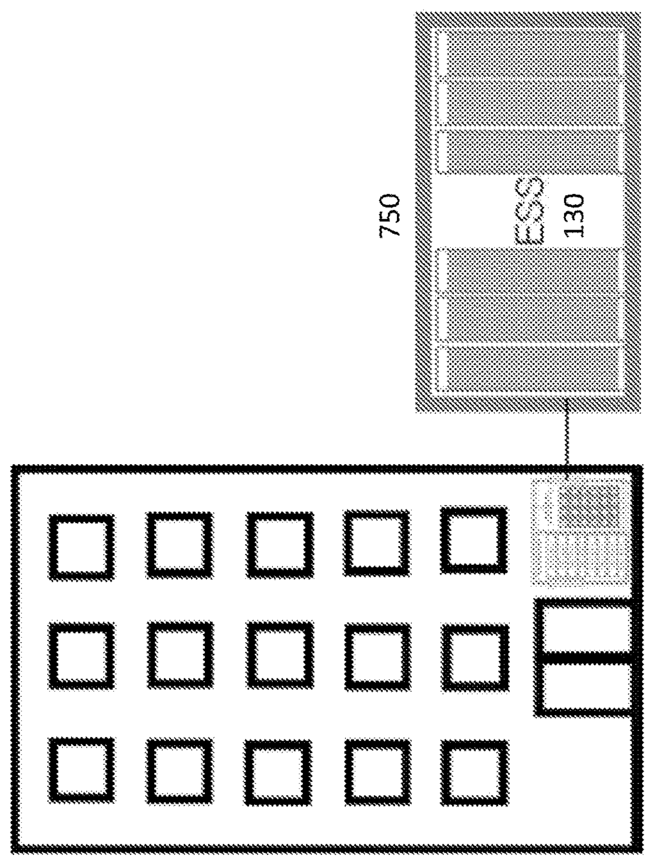
FIG. 7B depicts an application of a power cabinet and ESS containers to power a building or other structure.

FIGS. 7A and 7B illustrate two more potential applications of the systems and methods discussed herein. In FIG. 7A a mobile transport, such as a truck 700 and trailer 710, can carry a plurality of ESS 130 power sources. The truck 700 can comprise ESS containers 705*a-b* containing any of a plurality of energy banks. For example, a first ESS 705*a* can contain six energy banks, as illustrated, while a second ESS 705*b* contains three energy banks. The ESS on the truck 700 contains fully charged ESSs. A second trailer 710, contains a second arrangement of ESS cabinets, and represents depleted energy cabinets.

These mobile configurations can be attached to a power cabinet 120, and used to power large applications, such as a stage 720 to power a concert, show, music devices, and other applications. Such examples demonstrate the versatility of the systems and methods discussed herein. The collection of ESS cabinets on one or more mobile trucks trailer can be used to power a show or event 720, and is interchangeable with other power systems as discussed herein, to provide sufficient power.

Similarly, FIG. 7B shows how a trailer 750 can contain a plurality of ESS cabinets to power a building 730, such as an apartment building, mobile trailer, home, office building or other structure. The trailer 750 can be stationary or mobile and connect to a power cabinet 120 positioned within or external to the building being powered by the ESS containers.

In FIGS. 8-11, a fleet of ESS trailers can be deployed at a renewable energy production locations, e.g., farms, traditional substations, power generation and distribution sites, etc., to capture and load shift energy. Various types of energy and power sources can be used to both power and be powered by the ESS fleet.

Figure 8:
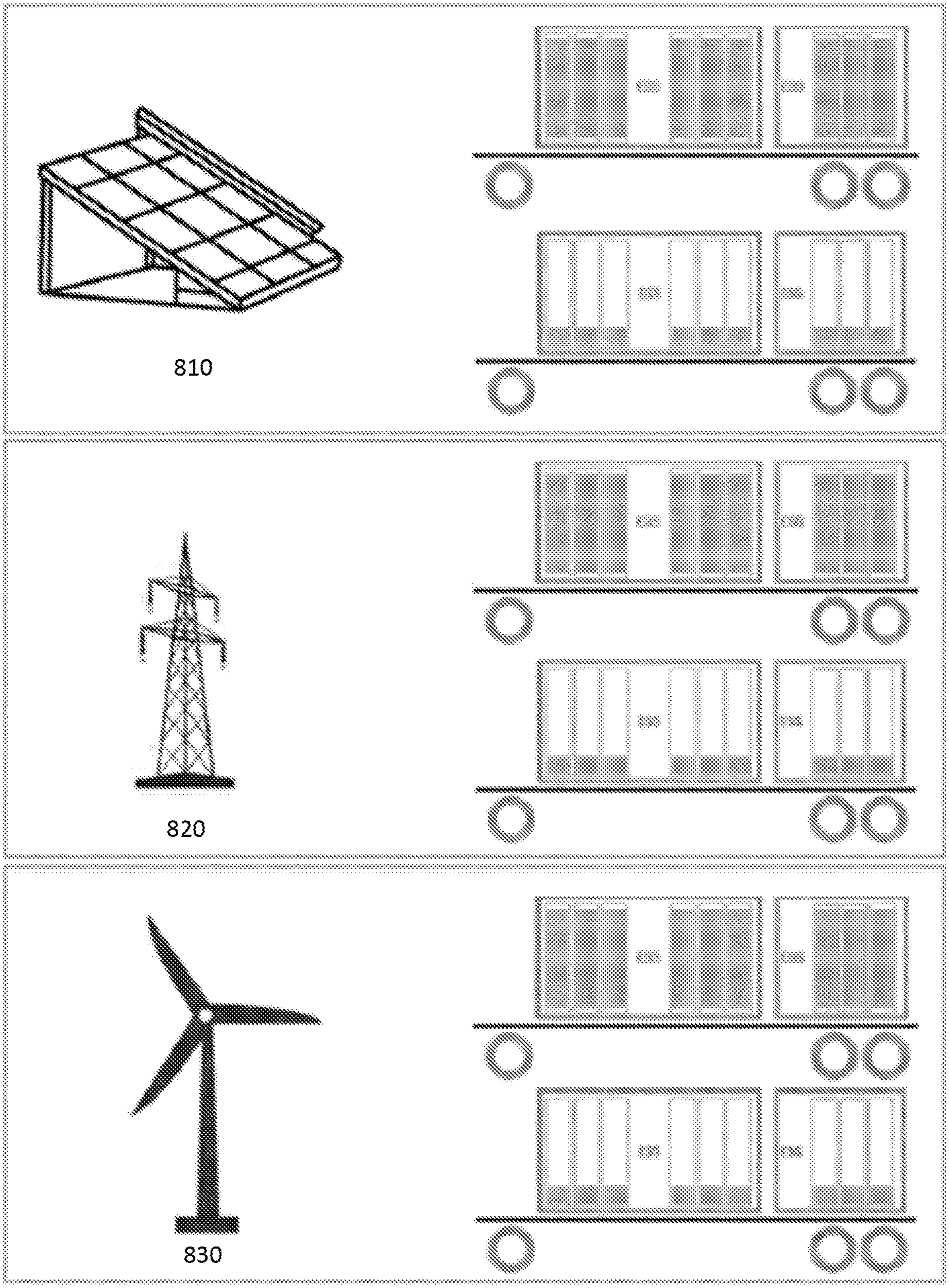
FIG. 8 depicts multiple ESS containers on a trailer that may be utilized at a solar farm, electrical grid, or wind farm.

In a first example, as seen in FIG. 8, a plurality of solar panels 810, can be used to generate power used to recharge an ESS fleet. Alternatively, an ESS fleet is able to provide power to the solar panels 810 as needed for their operation.

The ESS fleet can similarly achieve such power acquisition and delivery to systems such as an electrical grid 820 or utility grid, and other forms of energy production, renewable energy production and generation, like a wind turbine 830. It will be appreciated that the illustrated examples are not the only power systems to which the ESS and system embodiments may be applied. The present invention's ability to integrate with existing power systems, devices, and applications make it a versatile tool for providing energy to a variety of energy systems, and also being charged by such systems.

The present embodiments are also unique in that a remote site can capture power and that stored energy can be easily moved to another location that may or may not have access to power. The mobility of the ESS trailer systems can transport energy to a location where the traditional grid cannot reach; may have been attacked or damaged; or where power distribution and service costs may be prohibitively expensive.

Trailers can also serve as peaking resources for these renewable production facilities, and capture power that would not have been otherwise realized. For example, it would be possible to take unwanted or underutilized power production, store it and use it when the value has increased, when the need arises or transport it to a location that can use the captured energy as needed. With respect to wind energy and wind turbines, for example, captured wind energy could directly be stored in ESS trailer systems. Such energy may have been unrealized or underutilized in the past, thus providing greater efficiency and power return.

Figure 9:
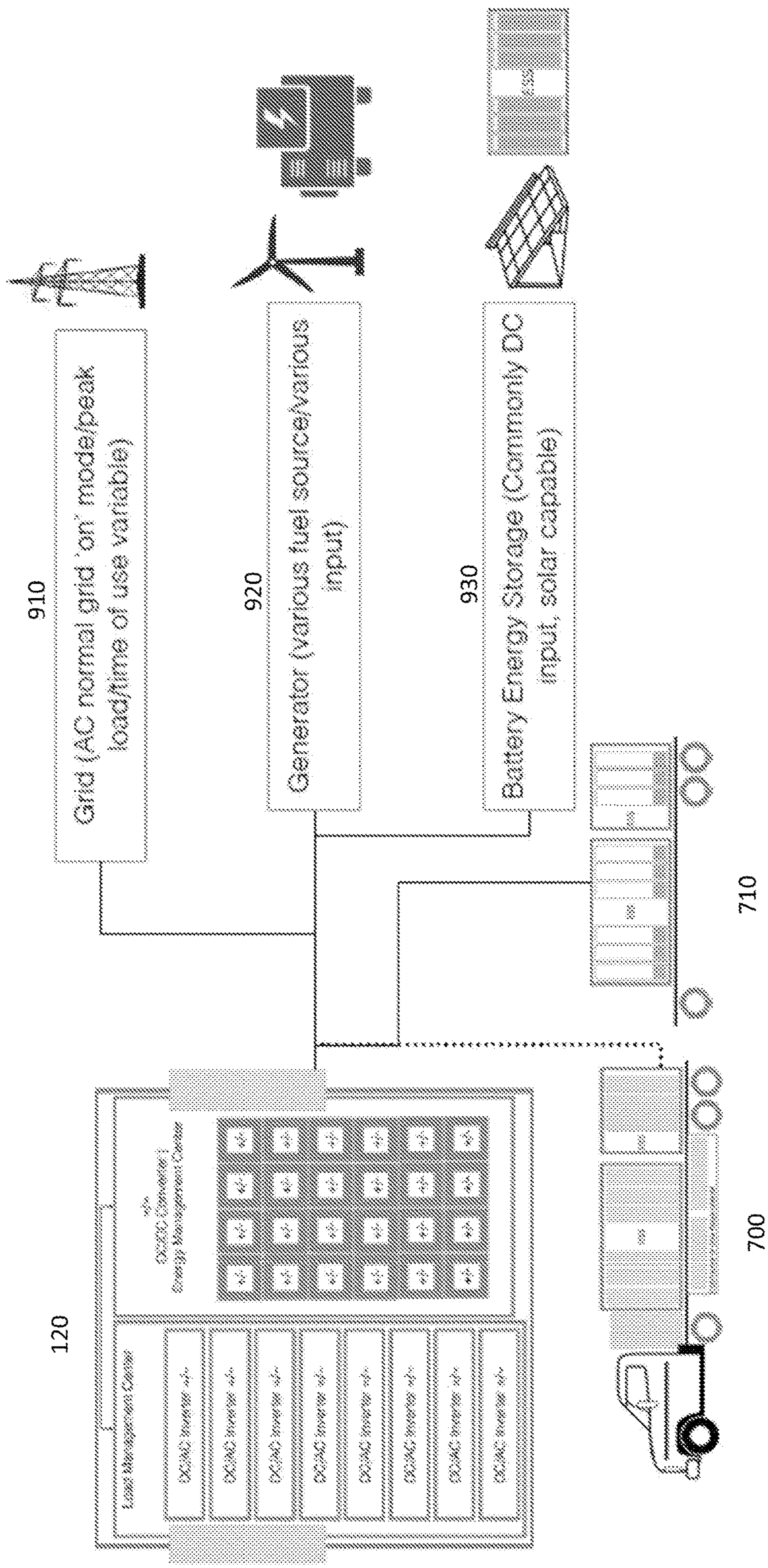
FIG. 9 depicts a mobile ESS arrangement that may be utilized at a solar farm, electrical grid, or wind farm.
Figure 10:
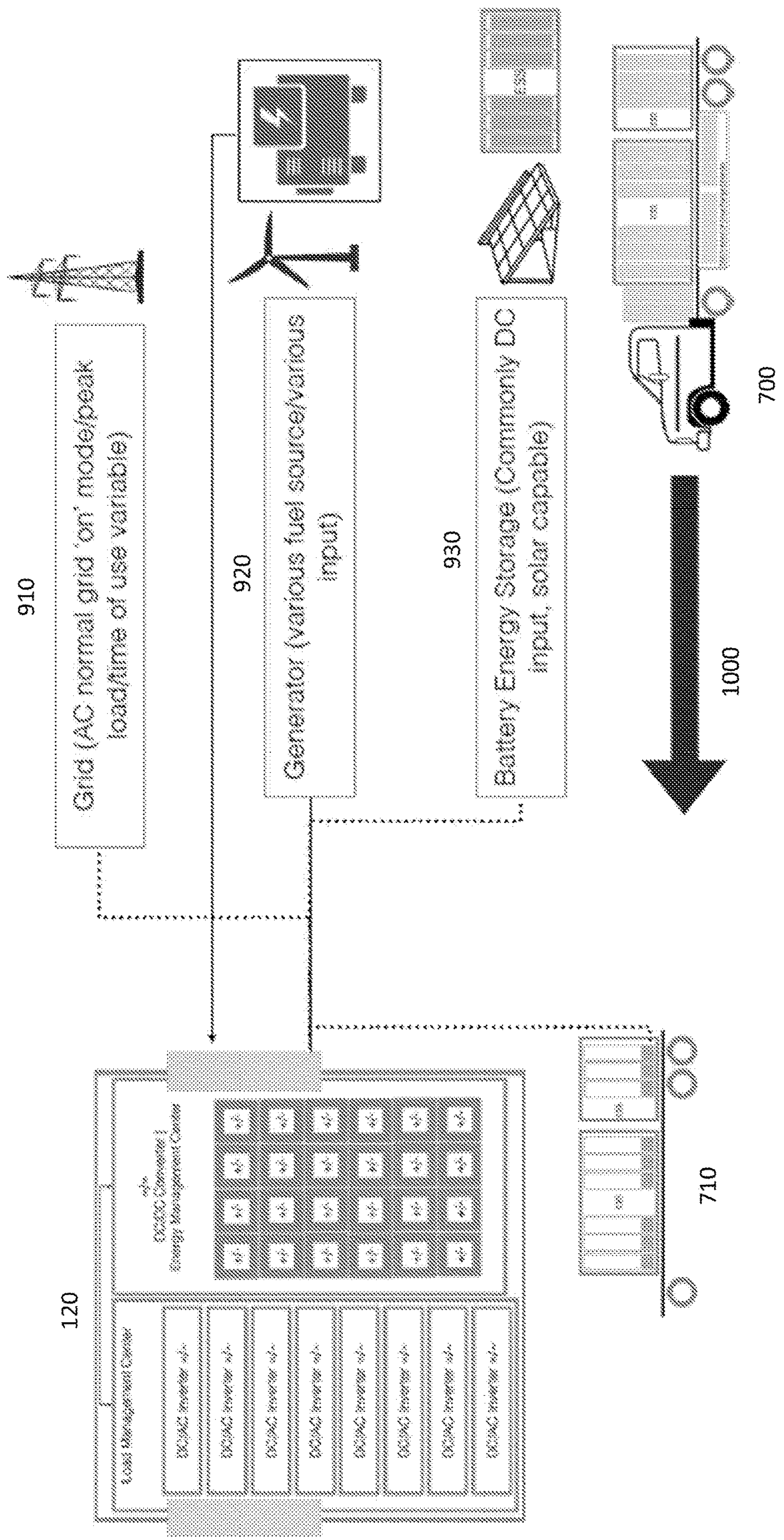
FIG. 10 depicts another mobile ESS arrangement that may be utilized at a solar farm, electrical grid, or wind farm.

FIGS. 9-10 expand upon the above examples, and illustrate embodiments where one or more ESS trailer systems can be connected to a power cabinet 120 linked to any of a variety types of power sources, from wind, solar, electrical grids, etc. In various, non-limiting examples, an electrical grid 910 can be a normal AC grid with "on" mode/peak load/variable time of use. A generator 920, e.g., with power generated by a wind turbine, can contribute energy to the ESS systems. And a battery-based energy storage system 930, which may be solar capable, with DC inputs, can be connected to the system as well. FIG. 10 illustrates the selective connectivity of one or more ESS trailer systems 700, 710 to such a configuration. In this manner, trucks and vehicles carrying such ESS mobile systems can selectively connect and disconnect from the system 100, and also be charged and/or powered by the ESS cabinets on the trailer system.

Figure 11:
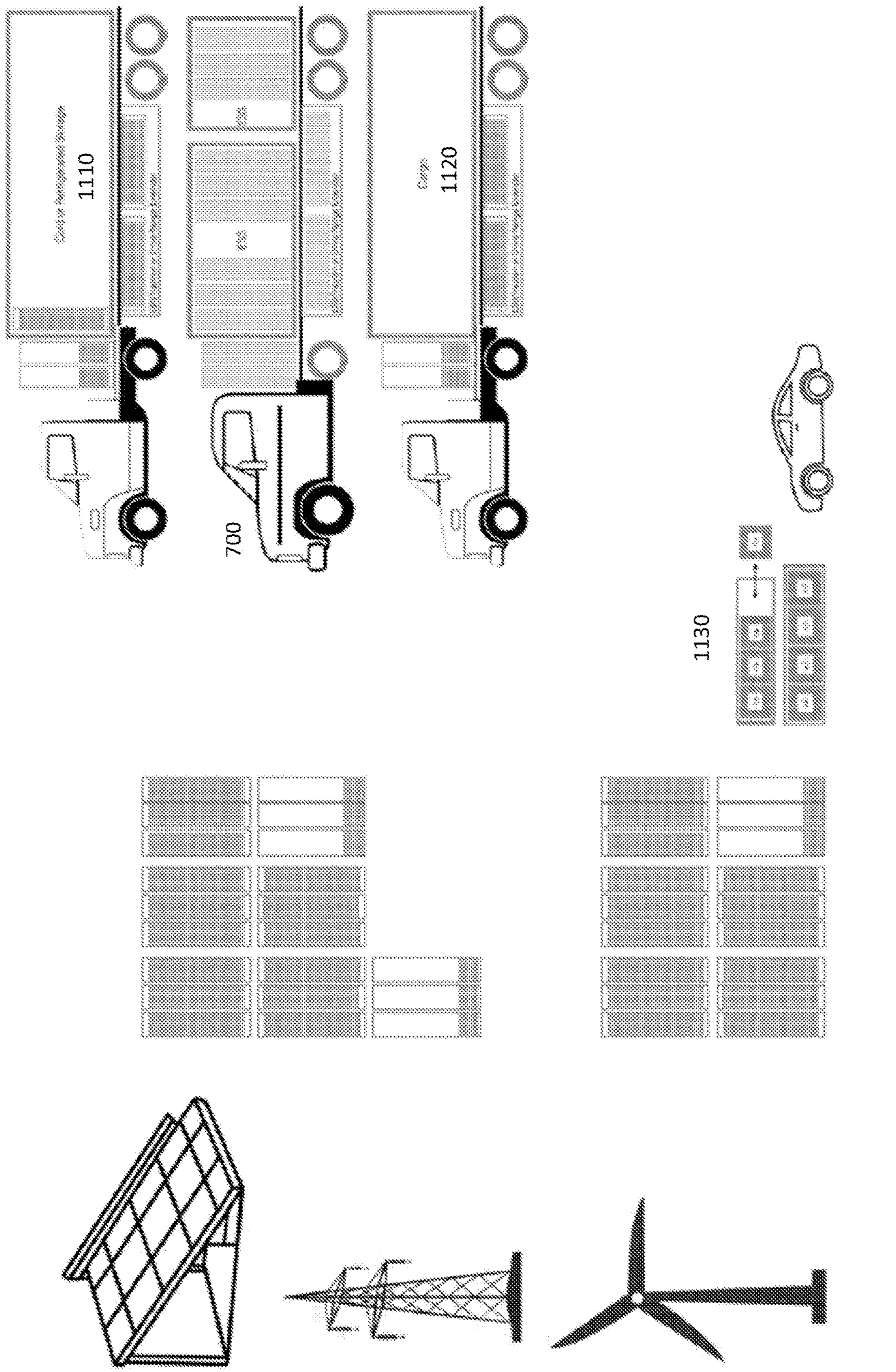
FIG. 11 illustrates examples of mobile ESS systems.

FIG. 11 illustrates various examples of mobile ESS trailer systems, including but not limited to cold or refrigerated storage 1110, transport of ESS systems, and transportation of cargo 1120. In embodiments, power from ESS banks as discussed herein can further power cars and automobiles 1130. As in the examples provided in FIGS. 9-10, the power for the ESS banks can come from a variety of sources, and be transported to a various power generation and renewable energy facilities.

Figure 12:
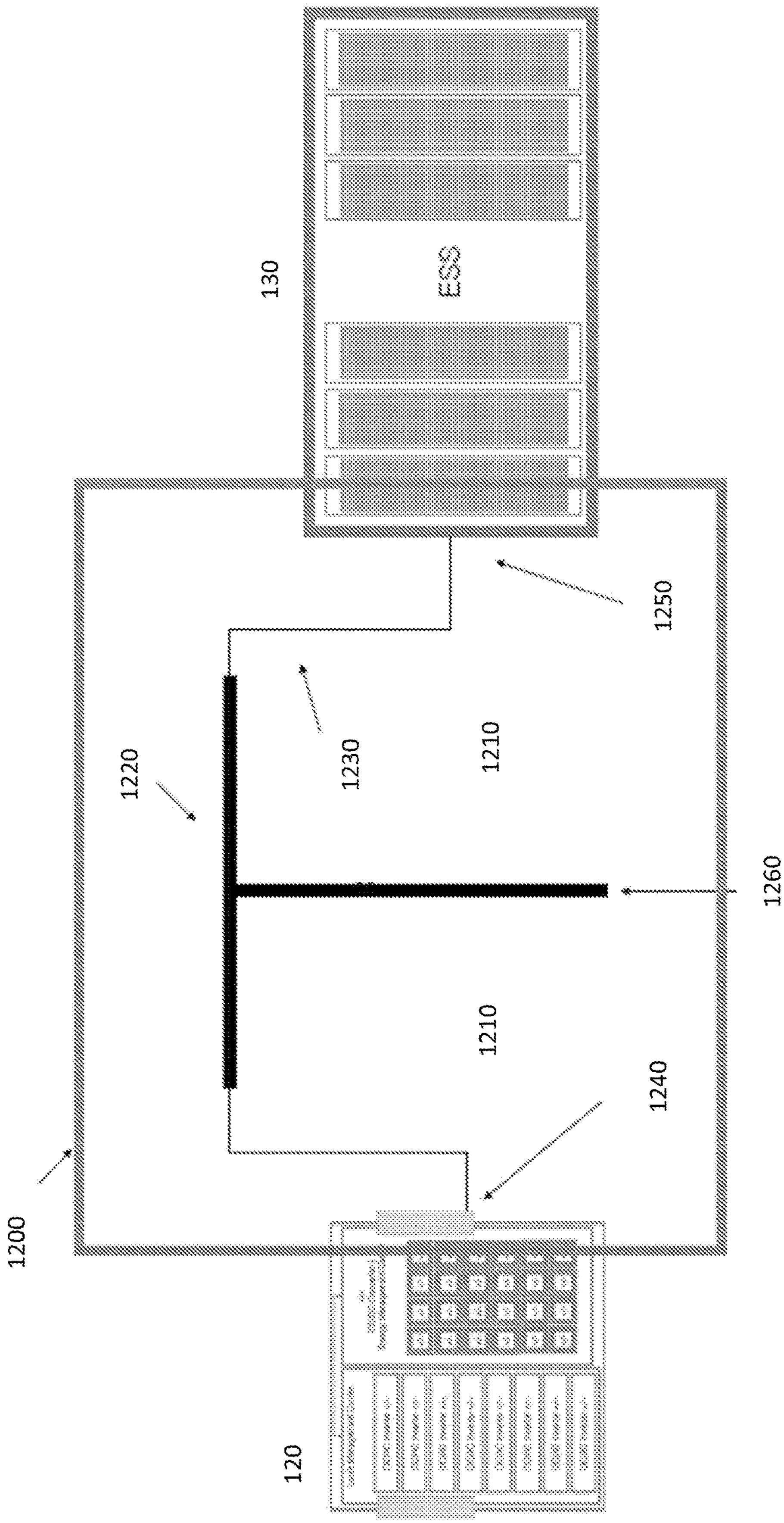
FIG. 12 illustrates an ESS container set, a power cabinet that is stationary or can be moved, and a "Stable" that allows the ESS to automatically or with limited human or system interaction connect to the power cabinet or by other means of electrical connection provide or collect power. There may be multiple 'stalls' in a 'stable', allowing for several power and energy systems to connect together in various arrangements.

FIG. 12 shows an automated or otherwise simplified method to connect and disconnect ESS or other power production equipment to what can be called a "Stable". A stable 1200, as shown can connect to a power cabinet 120, a facility or campus, or a power production/distribution location. A stable 1200 can be comprised of multiple quick/auto connect and disconnect "Stalls" 1210. These stalls provide a means and method to easily swap mobile ESS 130 or other energy and power production containers.

The stalls 1210 can comprise an overhead electrical causeway 1220 along with a grounding and bracing mechanism 1260 for the overhead causeway 1220. Suspended flexible cables 1230 can then link to the power cabinet 120 and ESS 130 or other energy and power production containers. The stall further comprises junctions for power inputs to the power cabinet 1240, a human assisted or self-locating electrical coupling 1250 joining to the ESS 130. Accordingly, mobile trailers and other vehicles carrying ESS containers can efficiently and easily connect and be charged, swapped, replaced, and otherwise connected or disconnected to the system.

Figure 13:
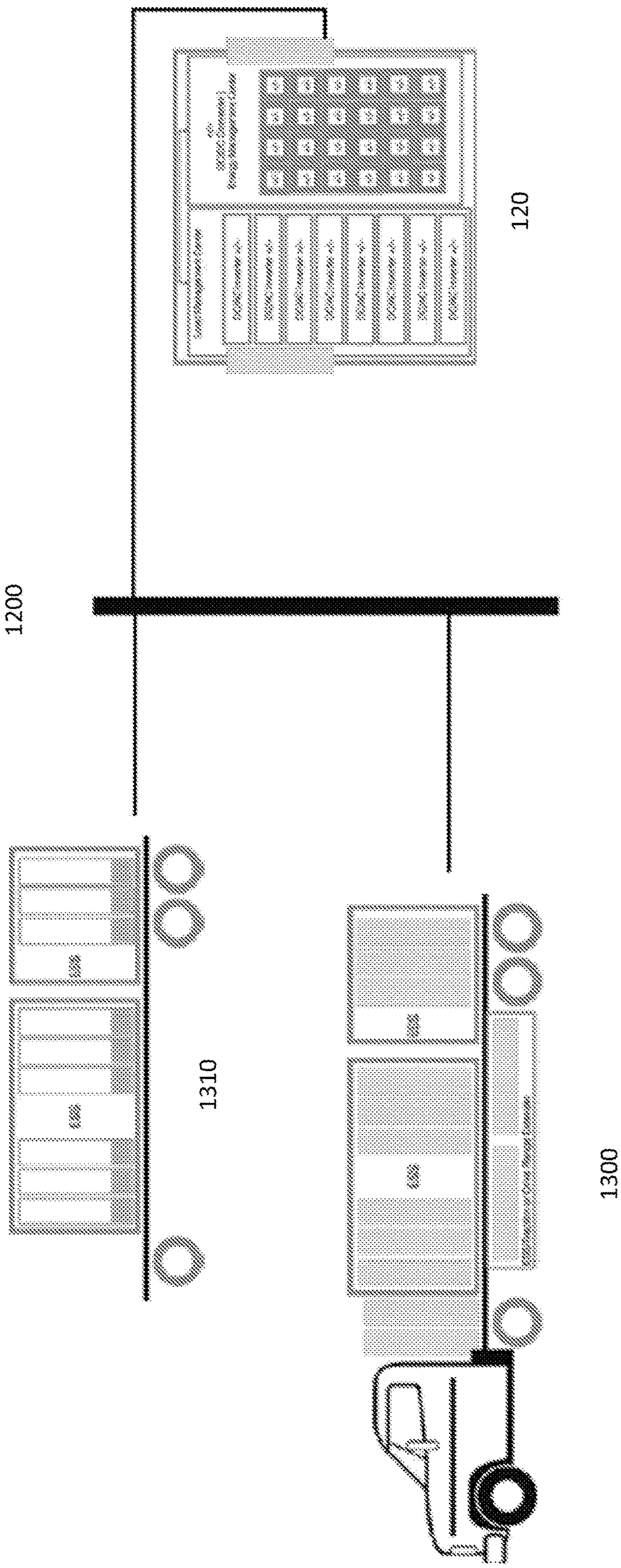
FIG. 13 illustrates another ESS and power cabinet, and stable configuration.

FIG. 13 illustrates an example of a set of mobile trailers 1300, 1310 connected to a stable 1200. The ESS on the mobile trailer 1300 can deliver power to the depleted set of ESS on the second mobile trailer 1310. Likewise, the power can be managed to perform the reverse operation, and fill up the ESS containers on mobile trailer 1300. Accordingly, the stable 1200 set of stalls are capable of accepting or releasing energy to, from, and/or between mobile containers, thus allowing power to be continuously delivered and moved.

The network of stables that may be installed or deployed at power generation facilities, sub stations, commercial and industrial facilities. Accordingly, these stables allow of energy in and out in a temporary or long-term basis.

Figure 14:
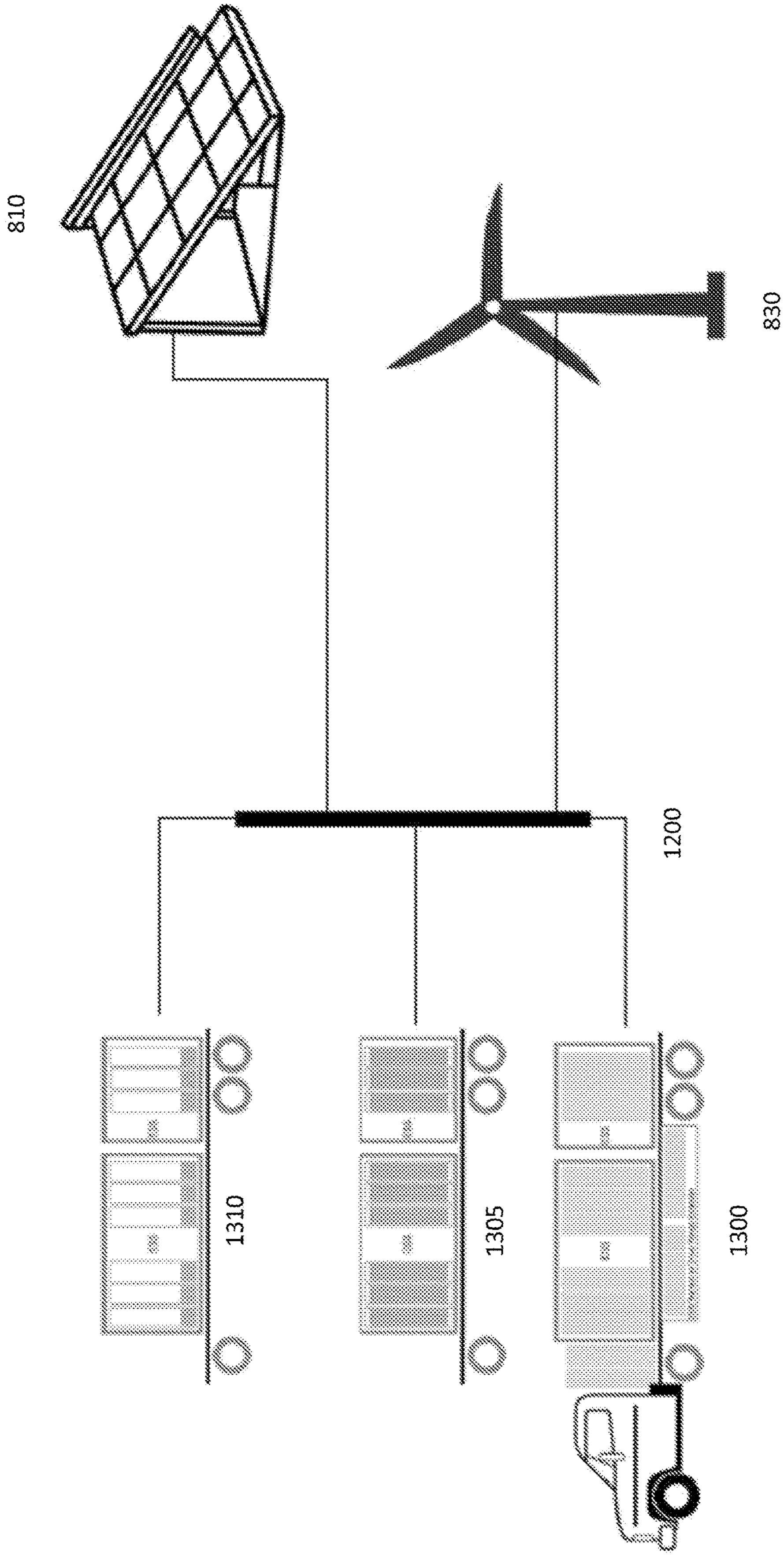
FIG. 14 depicts an ESS, power cabinet, and stable configuration, with energy going towards multiple stalls.

In another example, FIG. 14 shows that a stable 1200 and set of stalls can contain a plurality of ESS mobile containers 1300, 1305, 1310 capable of accepting or releasing power.

Power may be delivered to any or all of the ESS mobile containers from another ESS mobile container, or from an energy source such as solar panels 810, a wind turbine 830 or other renewable energy source, electrical grid, power generator, or other power source connected to the stable 1200. Again, the stable assists in enabling power to be continuously delivered and moved.

In yet another embodiment, Mobile ESS unit(s) may arrive at a Power Cabinet 120 or stable 1200. Connections can be made safely by hand with traditional high voltage and high current connectors such connectors available and used in power distribution, like Camlok, Amphenol or Socapex. These connections can be energized once the operator has indicated there is a safe connection established or automated utilizing circuit testing signals or physical signal indication.

It would also be possible to have the connections auto align, connect, establish and verify safe connections and docking as with the physical connections made with tractor trailer payloads or locomotive cars today but physically and electrically.

It will be appreciated that these illustrated and examples are not representative of every power configuration, combination, and application that can be utilized with the systems and methods discussed herein. Stables with multiple stalls could, in embodiments, be located at a power production facility showing multiple ESS mobile containers at varied states of charge. The stalls connect the trailers to the stable and the stables are connected to the energy production facility or site to deliver power.

Figure 15:
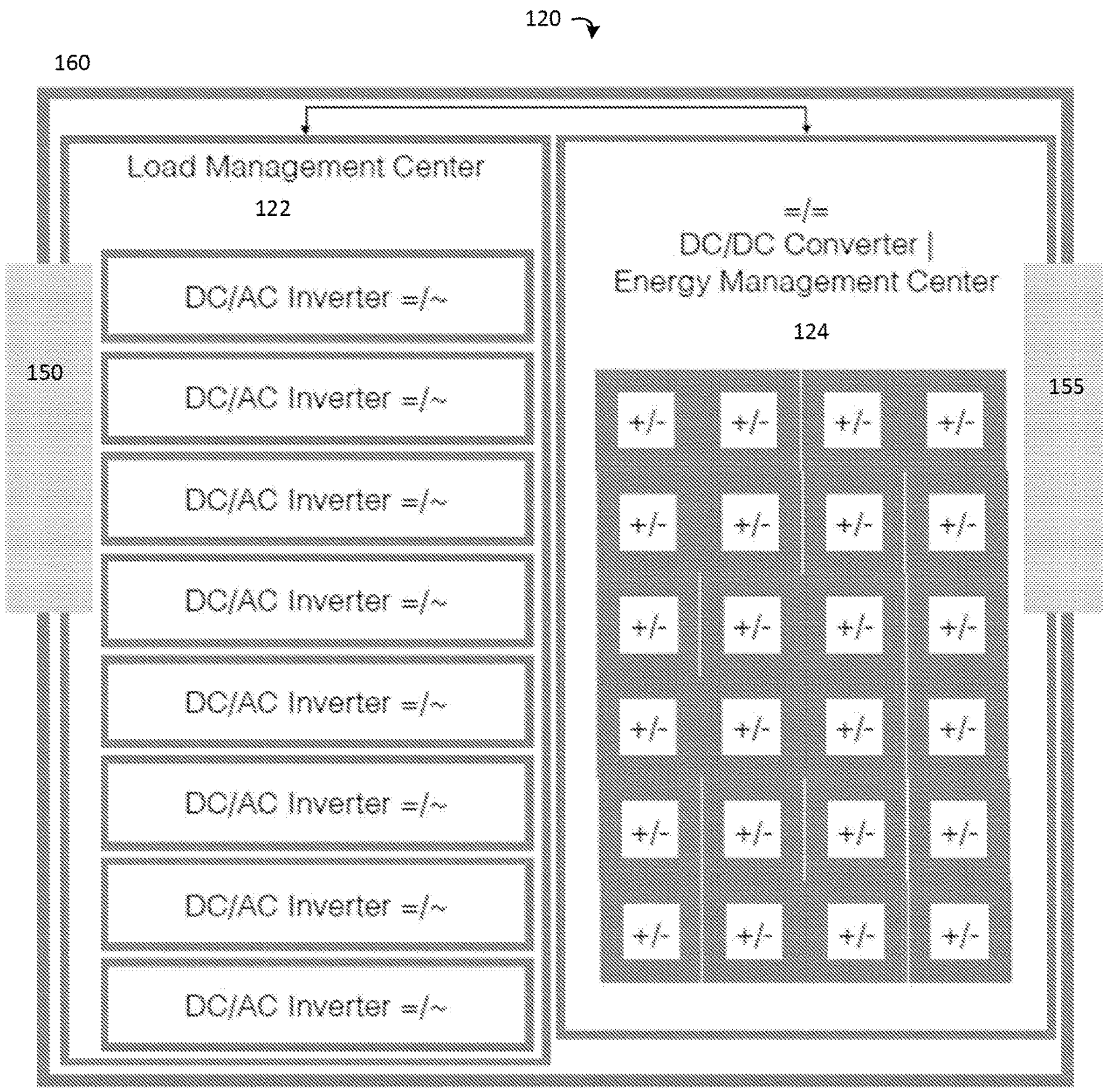
FIG. 15 depicts an independent energy storage module integrated with a plurality of connected modules.

FIG. 15 depicts an independent energy storage module, i.e., a power cabinet 120, that is integrated with a plurality of connected modules. The power cabinet comprises a load management center 122 with a Load Access/Distribution Panel 150, and an Energy Management Center 124 with a DC/AC input panel 155. The Load Management Center 122 comprises a plurality DC/AC inverters, as discussed herein, and the Energy Management Center 124 comprises a plurality of DC/DC converters.

This energy storage module can be physically and electrically connected to provide one voltage or multiple voltages with voltage conversion circuitry, they can also be connected by fixed DC bus or by hand. Once a group is assembled they can further be racked, stacked, stored, etc., to locate them within a larger array of groups to create a substantial amount of energy in one enclosure 160.

Once in the enclosure 160, the groups or racks can act together or independently to contribute energy to a collective, independent or voltage combination bus. The enclosure should be hardened and capable of supporting the weights of the internal modules and racking equipment which may be significant. The enclosure can physically be made to support as many modules and racks as are required for the application it is designed; Energy Storage, Auxiliary Power, Motive or Traction Power etc.

There may be external physical attachment or anchor points that would allow the enclosure and thereby the racks and energy modules contained to physically link to other enclosures or other devices to be secured against fall, or for transportation short or long. The enclosures may or may not need to have outdoor rating requirements as needed.

The physical attachment points may or may not either electrically connect or align the electrical connection points of the device. The safety circuitry built into common batteries or other energy storage devices today may be sufficient to protect the collective device however additional safety circuitry may be used to confirm orientation and secure connection before providing or delivering the full energy flow.

Unbalanced phases, various voltages and various load sizes are simultaneously handled through the Distribution panel. Both high and low frequency inverters are capable of operating in series, parallel and can provide multiple voltage and phase configurations from a single device. Multiple inverters can be arranged in the Load Management Center to deliver reconfigurable power depending on the required load. Many are capable of doing so 'off the shelf'.

Various DC and AC inputs can be provided into the panel. These inputs are managed with 'off the shelf' DC/DC converters or rectified AC charging devices. The Energy Management Center balances inputs to load and to recharge the on-board energy storage. A power cabinet serves as a 'way-station' for additional fuel sources to be added as needed. During times of low power demand the power cabinet can provide long duration operation reducing the immediacy of new 'energy sources' to be delivered.

During high power demands the power cabinet can maintain short duration exchanges of energy sources while maintaining power continuity. Once the new energy source is added the on-board energy storage system can trickle charge while the larger energy source provides primary delivery of power through the Energy management Center to the Load Management Center.

Figure 16:
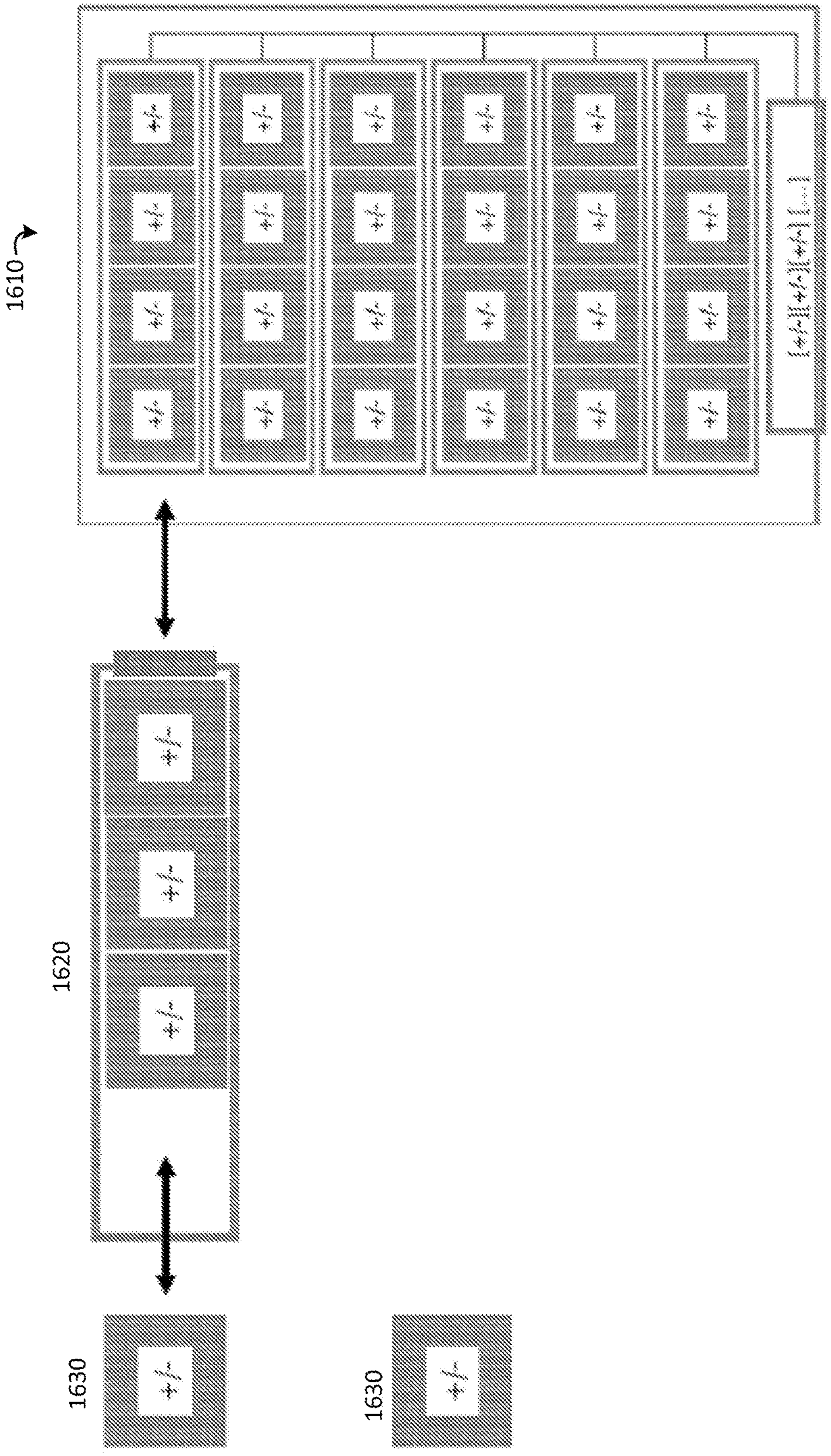
FIG. 16 depicts a power cabinet comprised of linkable and individual energy storage components.

FIG. 16 illustrates a power cabinet embodiment 1610 comprised of linkable 1630 individual internal energy storage components 1630 (see also FIGS. 21-23), an Energy Management Center 124 that operates the internal energy storage, energy inputs and distributes those energy resources to the Load Management Center 122 which in turn feeds the external application the appropriate voltage to the Load Access/Distribution Panel 150. The Power Cabinet 1600 can be a semi/permanent device serving more of a UPS function or be used to provide power in an ad hoc application such as a temporary event without sufficient power service.

Unlike a traditional combustion generator this system can more efficiently deliver specific voltages to specific loads without the use of voltage transformers down line. In a temporary event, where sufficient power is not available a large combustion generator may be used to provide power. A 3-phase AC generator operates best when loads are evenly balanced across each leg of the phase being generated, and will utilize downline transformers to step down voltage for appliances with smaller loads. Therefore, this architecture is more efficient and versatile.

Figure 17A:
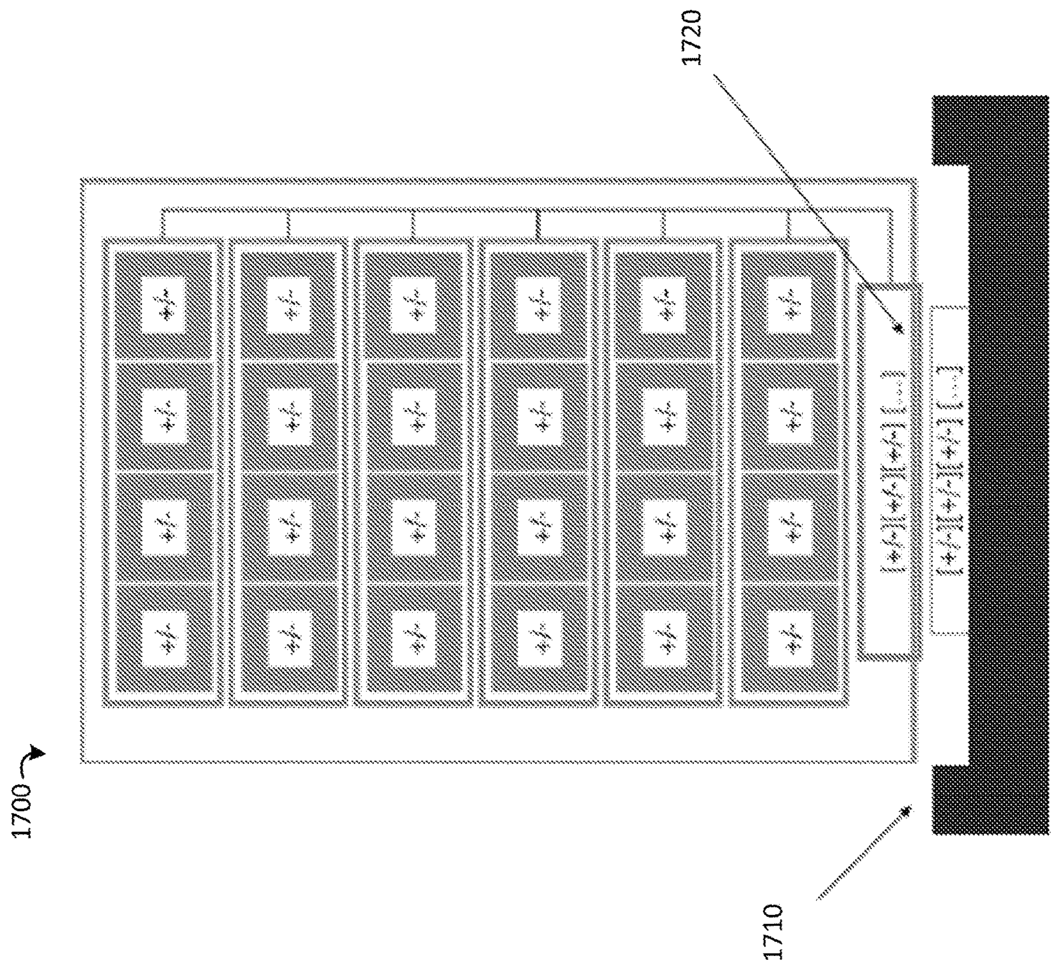
FIG. 17A depicts a top view of an ESS container layout.
Figure 17B:
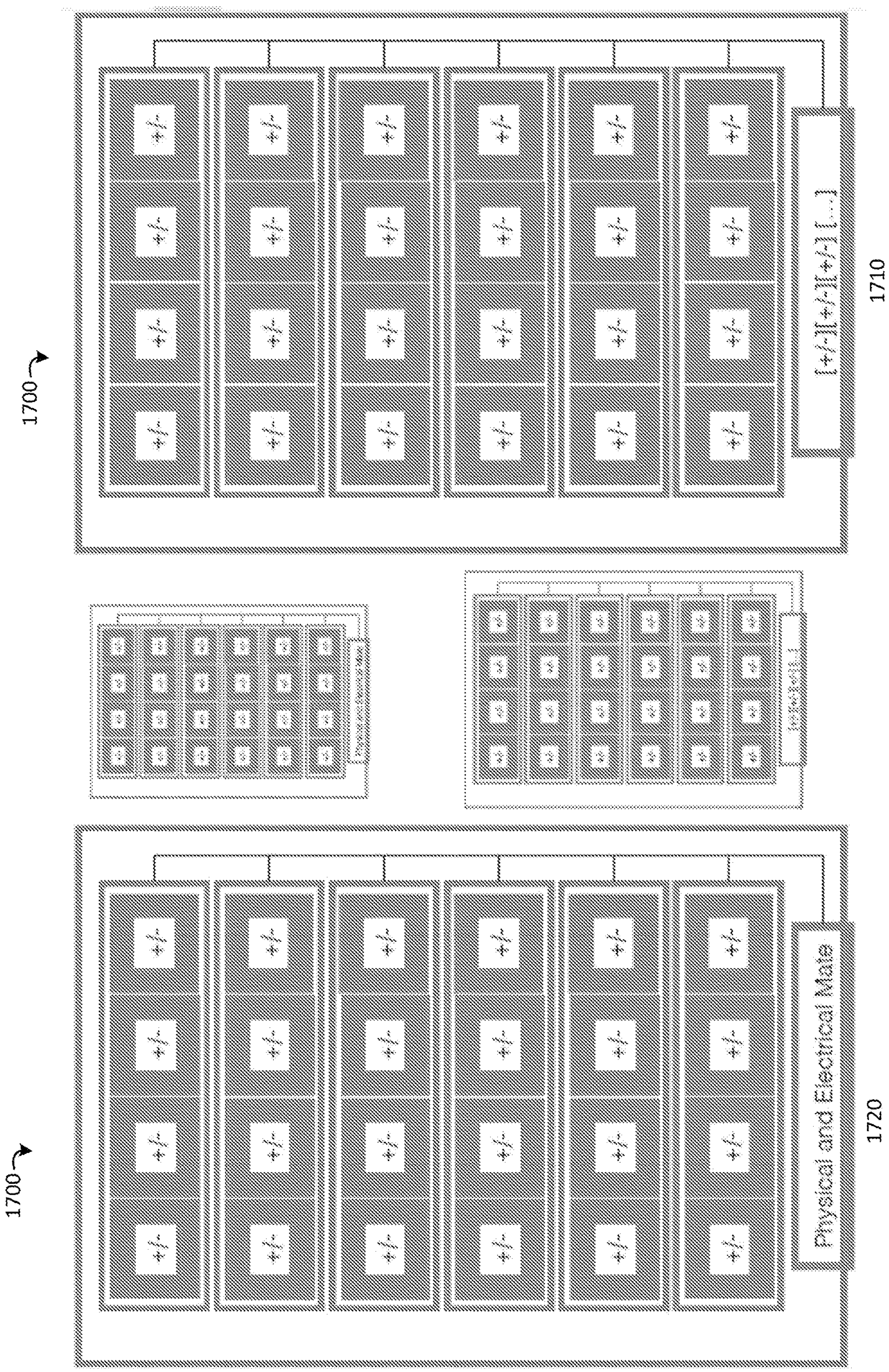
FIG. 17B depicts a layout of a plurality of ESS containers.

FIGS. 17A-17B illustrate a top view of a common layout of a ESS container and the layout of an efficient modular ESS are shown. Commonly, battery-based ESS units today combine racks of batteries or other energy storage devices in a shipping container or similar enclosure together with DC/AC equipment. Technicians can assemble these units, which require physical space internally for a technician to operate and access the energy storage devices or the DC/AC equipment.

Utilizing a Power Cabinet or other external system for power conversion provides optimized physical space. Allowing the smaller racks and independent modules to be accessed from trays or removable covers reduces the wasted space a technician needs to install and maintain the racks in a traditional BESS. Enclosures can be electrically isolated from the greater group if errors or issues occur and can be accessed when appropriate.

The figures also demonstrates that a physical locking mechanism 1710 between an enclosure and a trailer or interconnecting bed 1730, as well as a physical and electrical locking mechanism 1720. The physical locking or locating of the enclosures can be adjusted and/or vary in design based on the physical device, trailer, etc., that the enclosure is connecting with. In embodiments, the physical and electrical connections are such that sliding or stacking can occur in various orientations.

Figure 18:
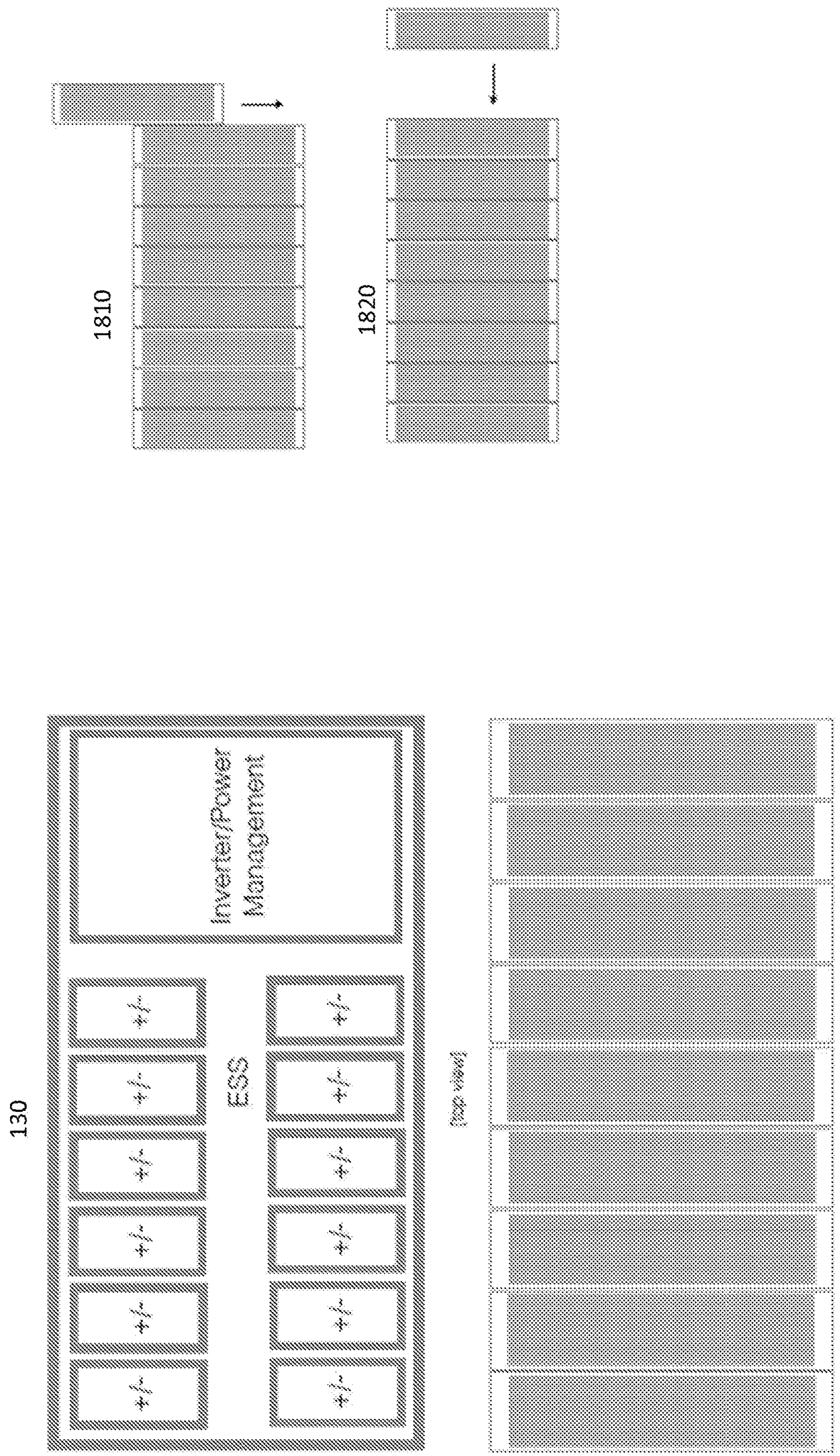
FIG. 18 depicts an energy storage module with both a physical and electrical locking mechanisms.

FIG. 18 shows an energy storage module with both a physical and electrical orientation to a locking mechanism that will capture and secure the device allowing it to receive or deliver energy. As indicated the mechanism can be located on a trailer, either specifically to be moved to another location to perform a function or simply to be motive power for the application. The specific physical and electrical coupling mechanisms may differ from application and function. For example, the modules may be vertically combinable 1810 and attach via a slidable connection. In other embodiments, the modules may be stackable 1820 realize the physical and electrical connection through the connection and orientation of the modules.

Figure 19:
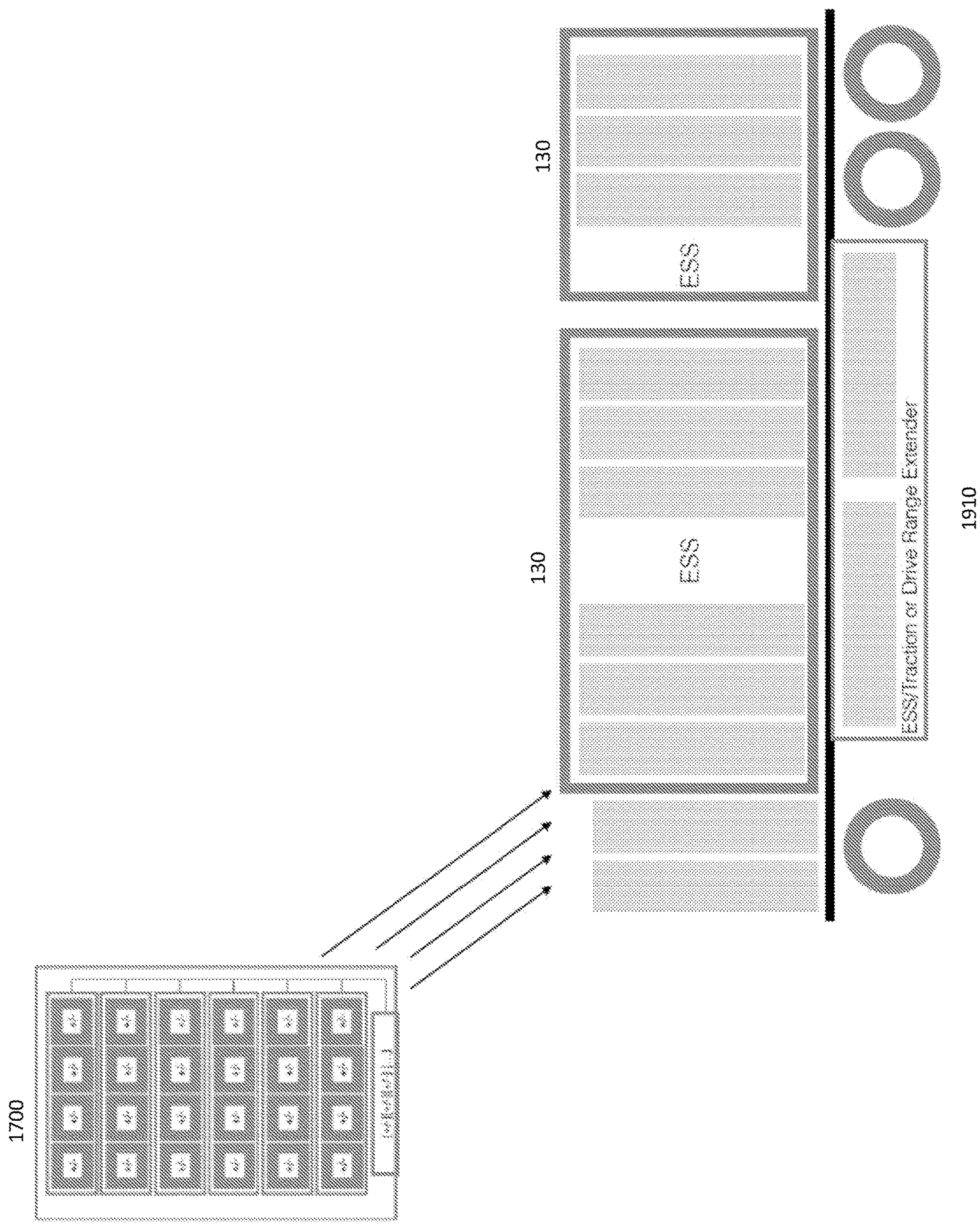
FIG. 19 depicts a trailer comprising a plurality of ESS groups.

In FIG. 19, a trailer is shown with several Energy Enclosures 1700 oriented collectively into ESS groups 130. These may be physically grouped or virtually assigned and grouped together for delivery to the same or different locations. The trailer also contains similar Energy Enclosures to those in the ESS groups that are intended to deliver traction or motive energy to the trailer itself or to the tractor/truck/vehicle that will move the trailer. It is possible that the trailer has mounted drive motors and may be capable of self-propelling utilizing the ESS energy or traction/motive Energy Enclosure. An ESS/Traction Extender or Drive Range Extender 1910 can provide energy to the vehicle. In such embodiments, the ESS acts as an efficient and renewable fuel source, by providing an alternative and rechargeable means to power the vehicle. The figure also provides an orientation that may be under the trailer bed which would have advantages for transportation; namely lower center of gravity, ease of access and available space.

In addition, tightly arranged battery or energy storage devices maximize volume. Utilizing a multi-voltage bus architecture allows smaller battery arrays to be used as individual 'tanks' or together as one depending on the application. Unlike traditional Battery Energy Storage Systems the reconfigurable nature of this architecture allows them to function as both a collective 'fuel tanker', individual fuel units or a combination as needed. Sub-components are also accessible allowing for human manageable units of portable energy.

This architecture allows for individual blocks, racks and entire groups to be used as transportation fuel, cabin/payload (example: cold storage) power and mass transport of alternative energy delivery, as discussed herein.

Moreover, individual banks, racks and containers can be consumed as needed based on any application, from transportation/traction, to on-board needs and off-loaded application specific requirements for the energy. It will be appreciated that that the Group Module(s) used as a traction can be used consumed independently from the ESS. Just as a Tractor Trailer would consume specific designated fuel for its transportation needs. Multiple 'tanks' of these modules can be on board the tractor trailer, on the cargo trailer and even the payload of energy could be used for traction fuel/energy as well if used correctly in this architecture. Only a portion of the designated traction energy has been used in this example.

In an example the Mobile ESS unit(s) can provide energy to load through a power cabinet. It is possible in such an architecture to consume the Mobile ESS as a single unit or draw down individual groups or racks independently or in small groups that are subordinate to the whole. Two groups may be consumed and two other groups may be in the process of providing power. In such examples, the Traction or Drive Range 1910 energy need not be used in this application.

The Mobile ESS unit(s) can also be used as a single large collective unit. While the energy has been providing power to the loads through the Power Cabinet, the Mobile ESS also provide energy to the trailer traction or drive energy system. This may or may not be required and would be a determination made by the system or operator based on where the trailer and container, Mobile ESS and other cargo may need to travel next.

An application of this same architecture could be to a transportation application for mobile cold or refrigerated storage. In such a system, the Tractor or mobile vehicle consumes the energy needed to move the cargo and the cargo can either take advantage of the energy on the trailer, inside of the container or on-board the tractor.

Figure 20:
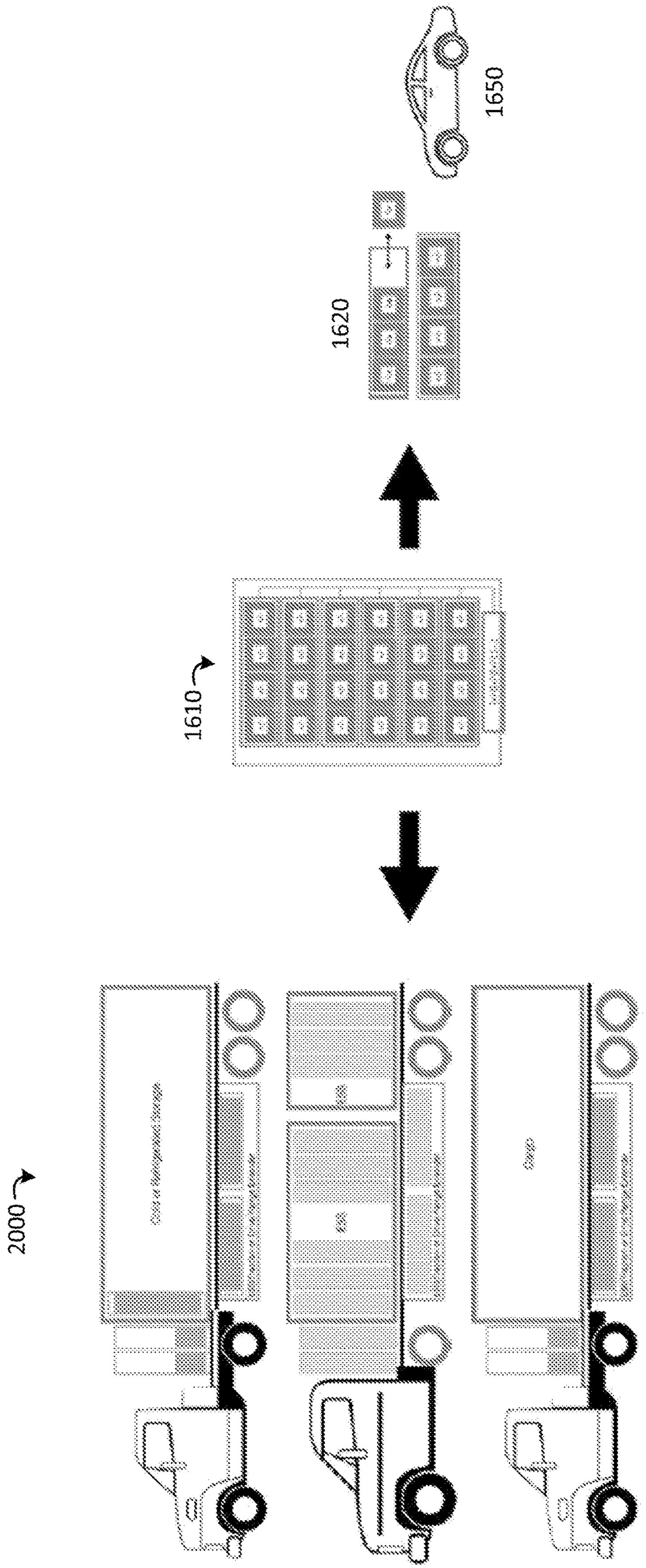
FIG. 20 depicts an energy enclosure with modular portable components.

In FIG. 20, collectively the Energy Enclosure which may utilize modular portable components 1620 could be used to provide ESS, Motive or Traction and payload power to the larger fleet vehicles 2000 or simply be transported as a vending device to provide smaller blocks of energy to extend the range of or directly power smaller personal vehicles 1650. The Energy Enclosure design 1610 allows for renewable energy capture and storage; movement of renewable energy to a location that may otherwise be without grid services; utilization of renewable energy as a motive source of power for large and small vehicles and can deliver energy as an auxiliary power device for cold storage or other needs during transportation.

Figure 21:
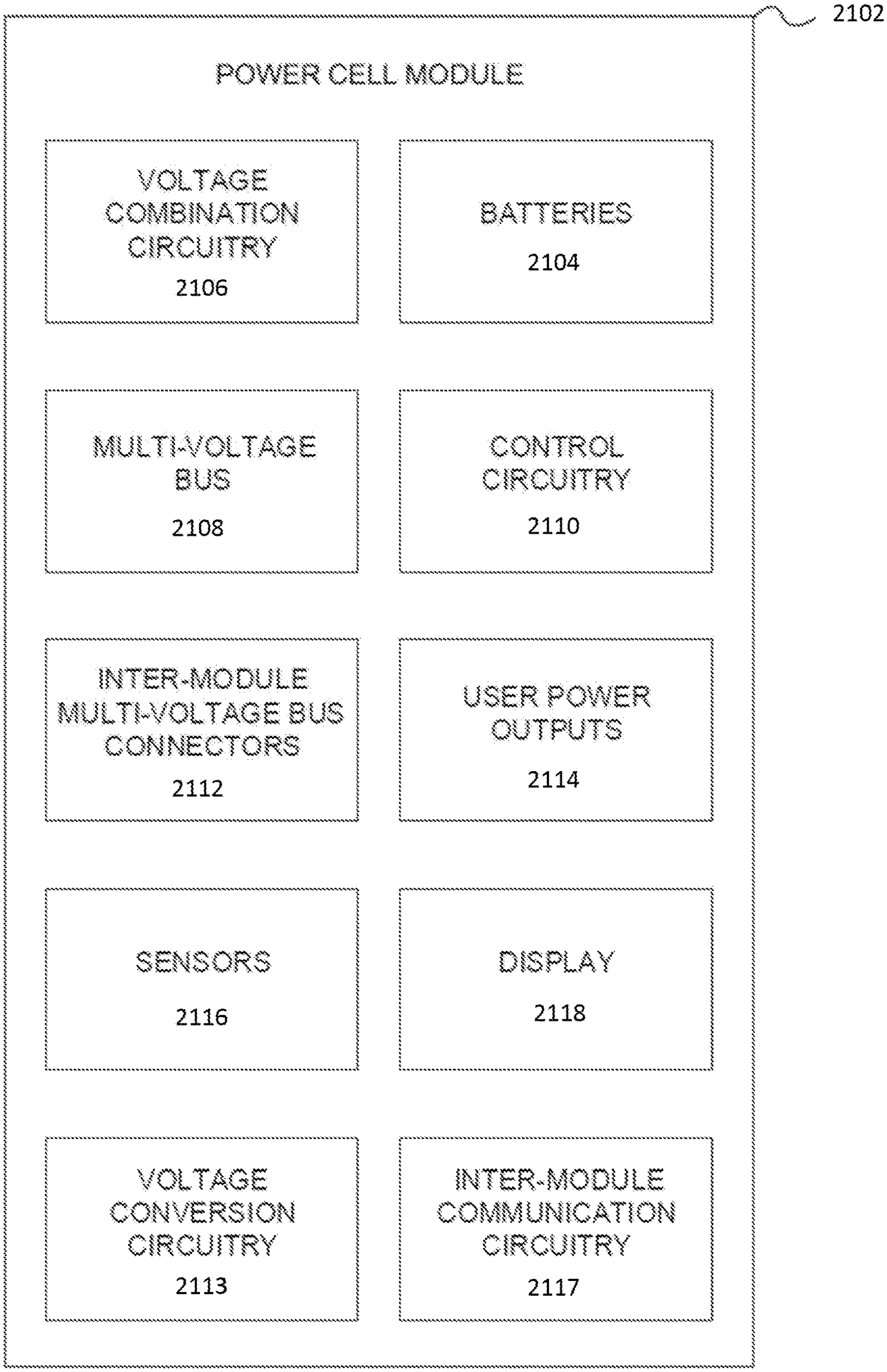
FIG. 21 is a block diagram of a power cell module, in accordance with embodiments.

FIG. 21 is a block diagram of an exemplary power cell module 2102, which could be used, in embodiments, such as within mobile ESS units, modular ESS, and other. The power cell module 2102 includes a plurality of batteries 2104, voltage combination circuitry 2106, a multi-voltage bus 2108, control circuitry 2110, inter-module multi-voltage bus connectors 2112, user power outputs 2114, voltage conversion circuitry 2113, inter-module communication circuitry 2117, sensors 2116, and a display 2118, according to various embodiments. The components of the power cell module 2102 enable the power cell module 2102 to function as a standalone power supply or to connect with other power cell modules as part of a bank or stack of power cell modules that collectively provide electricity to one or more electronic appliances.

In one embodiment, the power cell module 2102 includes a plurality of batteries 2104. The batteries 2104 can include one or more of lead acid batteries, lithium-ion batteries, Nickel-Zinc batteries, Nickel-Cadmium batteries, Nickel-metal-hydride batteries, and Zinc-Magnesium oxide batteries. In one embodiment, each of the batteries 2104 within a given power cell module 2102 is a same type of battery. Alternatively, in some embodiments, the batteries 2104 in a given power cell module 2102 can include multiple types of batteries.

In one example, in accordance with one embodiment, the power cell module 2102 includes four individual batteries 2104. The individual batteries 2104 include 12 V lead acid batteries. The power cell module 2102 utilizes the 12 V lead acid batteries to provide electricity to one more electronic appliances either as a standalone power cell module 2102, or as part of a bank or stack of power cell modules 2102 that collectively provide electricity to one or more electronic appliances.

In one embodiment, the power cell module 2102 includes voltage combination circuitry 2106. The voltage combination circuitry 2106 is coupled to the terminals of the batteries 2104 in order to provide, simultaneously, multiple output voltages from the batteries 2104. The output voltages provided by the voltage combination circuitry 2106 correspond to various series and parallel connections of the batteries 2104. Thus, each output voltage provided by the voltage combination circuitry 2106 corresponds to a parallel connection of multiple of the batteries 2104, a series connection of multiple of the batteries 2104, or a combination of series and parallel connections of multiple of the batteries 2104.

In one embodiment, the voltage combination circuitry 2106 provides the multiple output voltages simultaneously. For example, the voltage combination circuitry 2106 can include one set of terminals that provide an output voltage that is a series connection of all the batteries 2104, one set of terminals that provides an output voltage that is a parallel connection of all of the batteries 2104, and a set of terminals that provides an output voltage that is a parallel connection of two sets of batteries wherein each set of batteries is a series connection of two or more of the batteries 2104.

In one embodiment, the voltage combination circuitry 2106 includes circuit components among the various connections that prohibit short-circuits among the various output voltages. For example, the connection between two terminals of two of the batteries 2104 can include one or more diodes configured to prohibit the flow of current in an undesired direction. This can ensure that the voltage combination circuitry 2106 can provide various combinations of voltages without short-circuiting and without the need of a multiplexer, according to one embodiment.

In one embodiment, the voltage combination circuitry 2106 provides all the output voltages simultaneously. The voltage combination circuitry 2106 does not generate the various output voltages via transformers, voltage multipliers, or charge pumps, according to an embodiment. Instead, the voltage combination circuitry 2106 provides each output voltage as series, parallel, or series and parallel connections between the various terminals of the batteries 2104, according to one embodiment.

In one embodiment, the power cell module 2102 includes a multi-voltage bus 2108. The multi-voltage bus 2108 receives the output voltages from the voltage combination circuitry 2106. The multi-voltage bus 2108 includes a plurality of voltage lines, one for each output voltage of the multi-voltage bus 2108. Thus, each voltage line of the multi-voltage bus 2108 carries a voltage corresponding to one of the respective output voltages from the voltage combination circuitry 2106. Accordingly, the multi-voltage bus 2108 simultaneously carries all output voltages from the voltage combination circuitry 2106, according to an embodiment.

In one embodiment, the multi-voltage bus 2108 is designed so that when the power cell module 2102 is connected in a bank of power cell modules, the multi-voltage bus 2108 connects to a corresponding multi-voltage bus from all of the power cell modules of the bank of power cell modules. Accordingly, when the power cell module 2102 is connected in a bank of power cell modules, the bank of power cell modules has a collective multi-voltage bus that is the continuation of each of the multi-voltage buses of the various power cell modules of the bank of power cell modules.

In one embodiment, when the power cell module 2102 is connected to a second power cell module, each line of the multi-voltage bus 2108 is electrically connected to a corresponding line of a multi-voltage bus of the second power cell module. If the multi-voltage bus 2108 includes three lines each carrying either a respective output voltage V1, V2, or V3, when the power cell module 2102 is connected to the second power cell module, the V1 line of the multi-voltage bus 2108 is connected to the V1 line of the multi-voltage bus of the second power cell module, the V2 line of the multi-voltage bus 2108 is connected to the V2 line of the multi-voltage bus of the second power cell module, and the V3 line of the multi-voltage bus 2108 is connected to the V3 line of the multi-voltage bus of the second power cell module. Accordingly, the multi-voltage bus 2108 of the modular battery power cell 2102 and the multi-voltage bus of the second power cell module form a collective multi-voltage bus including the V1 line, the V2 line, and V3 line. Each additional power cell module connected into the bank of power cell modules joins the collective multi-voltage bus. Each power cell module provides V1, V2, and V3 to the collective multi-voltage bus.

In one embodiment, the advantage of the multi-voltage bus is that users do not need to manually control the power cell modules to provide a particular desired voltage. If this were not the case, then it is possible that each power cell module would need to be manually or electronically configured by the user in the exact same way to avoid short-circuits or other electrical problems that can come with mismatched voltage connections between the various power cell modules. Instead, each power cell module, in accordance with one embodiment, provides all voltages and contributes to the collective multi-voltage bus. As will be set forth in greater detail below, this enables a very simple set up that requires little or no electrical knowledge from users before they can safely and effectively use the power cell modules either individually or in a bank of power cell modules.

In one embodiment, the power cell module 2102 includes control circuitry 2110. The control circuitry 2110 can include one or more processors or microcontrollers that control the operation of the power cell module 2102. The one or more processors can execute software instructions stored in one or more memories in order to control the functionality of the various aspects of the power cell module 2102. The one or more processors can also be controlled via manual interaction or wireless communication controlled inputs. The control circuitry 2110 can operate in accordance with firmware stored in the one or more memories.

In one embodiment, the control circuitry 2110 is able to selectively connect or disconnect the voltage combination circuitry 2106 from the multi-voltage bus 2108. For example, if the batteries 2104 are depleted, or in a fault state, that the control circuitry 2110 can operate switches are circuit breakers that disconnect the output voltages of the voltage combination circuitry 2106 from the multi-voltage bus 2108.

In one embodiment, the power cell module 2102 includes sensors 2116. The sensors 2116 sense various aspects of the power cell module 2102. The sensors 2116 provides sensor signals to the control circuitry 2110. The control circuitry 2110 can control the components and functionalities of the power cell module 2102 responsive to the sensor signals from the sensors 2116 and in accordance with internal logic of the control circuitry 2110. For example, the control circuitry 2110 can disconnect the voltage combination circuitry 2106 from the multi-voltage bus 2108 responsive to the sensor signals.

In one embodiment, the sensors 2116 can include multiple sensors that sense the voltages output by each battery 2104. The voltage sensors can output sensor signals to the control circuitry 2110 indicative of the voltage outputs of each battery. The voltage sensors can also sense the output voltages provided by the voltage combination circuitry 2106 and can provide sensor signals to the control circuitry 2110 indicative of the output voltages provided by the voltage combination circuitry 2106. The control circuitry 2110 can control components and functionality of the power cell module 2102 responsive to the sensed voltages. In one embodiment, the voltage sensors are part of the control circuitry 2110. Alternatively, the voltage sensors can be external to the control circuitry 2110.

In one embodiment, the sensors 2116 can include current sensors. The current sensors can sense the current flowing from each of the batteries 2104. The current sensors can sense the total current flowing from the power cell module 2102. The current sensors can also sense the current flowing from the batteries 2104 through each line of the multi-voltage bus 2108. The current sensors output sensor signals to the control circuitry 2110 indicative of the various currents flowing in and from the power cell module 2102. The control circuitry 2110 can control components and functionality of the power cell module 2102 responsive to the sensed currents. In one embodiment, the current sensors are part of the control circuitry 2110. Alternatively, the current sensors can be external to the control circuitry 2110.

In one embodiment, the sensors 2116 can include temperature sensors. The temperature sensors can sense the temperatures of the batteries 2104. The temperature sensors can sense a temperature within the power cell module 2102. The temperature sensors can also sense the temperature of various components within the power cell module 2102. The temperature sensors can output sensor signals indicative of the various temperatures to the control circuitry 2110. The control circuitry 2110 can then take action responsive to the temperatures. For example, the control circuitry 2110 can disconnect the voltage combination circuitry 2106 from the multi-voltage bus 2108 to stop the flow of current in response to an indication that the batteries 2104 overheating.

In one embodiment, the power cell module 2102 includes user power outputs 2114. The user power outputs 2114 include various ports each outputting a particular voltage. For example, the user power outputs 2114 can include one or more output ports for each voltage carried by the multi-voltage bus 2108. A user can connect an electronic appliance to one of the output ports in order to provide power to the electronic appliance. The user can connect the electronic appliance to the output port that carries the correct voltage for the electronic appliance. The power cell module 2102 can also include user power inputs that can receive electrical connections to provide power to the power cell module 2102.

If the multi-voltage bus 2108 includes three output voltages V1, V2, and V3, the user power outputs 2114 can include multiple output ports for each output voltage. Each output port can correspondence to a particular type of connection. Accordingly, there may be multiple types of output ports for a single output voltage to fit multiple types of electrical connectors for electronic appliances. In one embodiment, the user power outputs 2114 can receive dongles or adaptors that fit the output ports to particular common connection schemes. In one embodiment, if an electronic appliance requires a DC voltage other than those carried by the multi-voltage bus 2108, then an adapter can be plugged into one of the output ports, receive the voltage from the output port, and step the voltage up or down in order to achieve the voltage required by the electronic appliance.

In one embodiment, when the power cell module 2102 is connected in a bank of power cell modules, if a user plugs an electronic appliance into one of the user power outputs 2114, power is provided to the electronic appliance from each power cell module connected to the multi-voltage bus 2108. Thus, when an electronic appliance is plugged into the power output of one power cell module in a bank of power cell modules, the electronic appliance draws a portion of the overall current from each power cell module connected to the multi-voltage bus 2108. Thus, large numbers of power cell modules can be connected in a bank so that a particular electronic appliance, or several electronic appliances, can be powered for a long time by the bank of power cell modules.

In one embodiment, the power cell module 2102 includes voltage conversion circuitry 2113. The voltage conversion circuitry 2113 is connected to one or more of the voltage lines of the multi-voltage bus 2108. The voltage conversion circuitry 2113 receives one or more output voltages from the multi-voltage bus 2108 and generates other voltages. The other voltages can include DC voltages intermediate to the output voltages of the multi-voltage bus 2108, greater than the highest voltage carried by the multi-voltage bus 2108, less than the smallest voltage carried by the multi-voltage bus 2108, and voltages of a different type than the voltages carried by the multi-voltage bus 2108. The user power outputs 2114 can include one or more output ports for each voltage generated by the voltage conversion circuitry 2113. This enables users to plug electronic appliances into output ports that carry voltages other than those carried by the multi-voltage bus 2108.

In one embodiment, because the voltages generated by the voltage conversion circuitry 2113 are generated from the multi-voltage bus 2108, electronic appliances that receive voltages generated by the voltage conversion circuitry 2113 draw power from each of the power cell modules connected to the multi-voltage bus 2108.

In one embodiment, the voltage conversion circuitry 2113 receives a DC voltage from the multi-voltage bus 2108 and generates an AC voltage. The AC voltage is then provided to one or more of the user power outputs 2114. Accordingly, the voltage conversion circuitry 2113 can include one or more inverters to generate one or more AC voltages. In one embodiment, one of the AC voltages has an amplitude and frequency corresponding to the amplitude and frequency of a local municipal power grid. For example, one of the AC voltages can include 2110 V AC at 60 Hz, corresponding to standard wall voltage in North America and many other areas. Another AC voltage can include 220 V AC at 60 Hz, corresponding to the increased voltage at which some electronic appliances operate in North America and many other areas.

In one embodiment, in the event of a failure of the municipal power grid, electronic appliances that normally plug into the wall voltage, or into the higher than wall voltage, can be plugged into the power cell module 2102 or can otherwise receive power from the power cell module 2102. If the power cell module 2102 is connected in a bank of a large number of power cell modules, then the AC powered electronic appliances can draw power from all of the power cell modules that are connected to the multi-voltage bus 2108. In one embodiment, the system can be plugged into a standard wall outlet of a house when the municipal power grid is interrupted and is not supplying power. A power chord can be plugged into the wall outlet from one of the power cell modules. The power cell module converts one of the DC output voltages from the multi-voltage bus into an AC voltage having the correct frequency and amplitude for the wall outlet. The AC voltage is then supplied to the wall outlet. All of the wall outlets that are on the same circuit can now be powered by the AC voltage supplied from the power cell module or bank of power cell modules. Before doing this, the user will need to access the circuit box and trip the circuit breaker to that circuit so that if the municipal power grid comes back online there will not be a short circuit. The power cell module can include protective circuitry to protect the power cell module in the event of a short circuit. The power can be supplied via a bank of power cell modules.

In one embodiment, the voltage conversion circuitry 2113 can receive a voltage from the multi-voltage bus 2108 and can convert the voltage to one or more voltages associated with typical personal electronic device connectors. For example, many electronic devices are powered by a specified small voltage, such as 3.1 V or 5 V. Many electronic devices are adapted to receive voltages from standardized output ports such as USB 2.0, USB 3.0, micro USB, USB C, or other types of charging ports. The voltage conversion circuitry 2113 can generate the voltages associated with these types of charging ports. The user power outputs 2114 can include multiple charging ports that fit the various standard ports and that receive the proper voltages from the voltage conversion circuitry 2113. Users can then plug their personal electronic devices, such as mobile phones, tablets, ear phones, game controllers, wearable electronic devices, drones, and other kinds of personal electronic devices that can be charged from a standard output port, into the corresponding output ports of the user power outputs 2114 in order to charge their personal electronic devices.

In one embodiment, the power cell module 2102 includes a display 2118. The display 2118 can output data or other messages indicating a current state of the power cell module 2102. The display 2118 can indicate the number of power cell modules connected in a bank of power cell modules. The display 2118 can indicate the current level of charge in the batteries 2104, an indication of the current or power being output by the power cell module 2102, or a length of time until the batteries 2104 need to be recharged at the current power draw. The display 2118 can indicate whether there is a fault condition associated with the power cell module 2102. The display 2118 can provide instructions to a user for initializing, utilizing, or troubleshooting the power cell module 2102. The display 2118 can provide data indicating which of the user power outputs 2114 is currently in use. The display 2118 can provide information such as the temperature within the power cell module 2102 or the voltage levels of the batteries 2104.

In one embodiment, the control circuitry 2110 can control the display 2118. The control circuitry 2110 can output messages to the user via the display 2118. The control circuitry 2110 can output instructions to the user for operating the power cell module 2102 or for providing the current status of the power cell module 2102 to the user. The display can also display information pushed to other power cell modules or connected electronic devices.

In one embodiment, the power cell module 2102 includes inter-module multi-voltage bus connectors 2112. The inter-module multi-voltage bus connectors 2112 electrically connect the voltage lines of the multi-voltage bus 2108 to the corresponding voltage lines of a second power cell module. The inter-module multi-voltage bus connectors 2112 can include Anderson connectors or other types of standard or unique connectors that can couple the voltage lines of the multi-voltage bus 2108 to the corresponding voltage lines of the multi-voltage bus of a second power cell module.

In one embodiment, the inter-module multi-voltage bus connectors 2112 automatically connect the voltage lines of the multi-voltage bus 2108 to the corresponding voltage lines of a second power cell module when the power cell module 2102 is attached to the second power cell module. Accordingly, the inter-module multi-voltage bus connectors 2112 can include fasteners that assist in securely fastening the power cell module 2102 to a second power cell module when stacked together.

In one embodiment, the power cell module 2102 includes inter-module multi-voltage bus connectors 2112 on top and bottom surfaces of the power cell module 2102. Thus, when the power cell module 2102 is connected in a bank of power cell modules 2102, the power cell module 2102 can be connected to a second power cell module below the power cell module 2102, and a third power cell module can be connected to the top of the power cell module 2102. In one embodiment, the power cell module 2102 can include latches, releases, and other connection hardware that enables the power cell module 2102 to quickly attach to other power cell modules and to quickly be released from other power cell modules.

In one embodiment, the power cell module 2102 includes inter-module communication circuitry 2117. The inter-module communication circuitry 2117 enables the power cell module 2102 to communicate with other power cell modules in a bank of power cell modules in which the power cell module 2102 is connected. The inter-module communication circuitry 2117 can share the status or condition of each power cell module. In one embodiment, the inter-module communication circuitry 2117 includes wireless transceivers enabling the power cell modules to communicate with each other wirelessly. In one embodiment, the inter-module communication circuitry 2117 includes wired connections that enable the power cell modules to communicate with each other across wired connections. In one embodiment, the inter-module communication circuitry can enable the power cell module 2102 to establish which power cell module in a bank of connected power cell modules is the master or controlling power cell module.

In one embodiment, the inter-module communication circuitry can communicate with one or more users. For example, the inter-module communication circuitry 2117 can send alerts to the user regarding the current state of the inter-power cell module 2102, or the bank of inter-power cell modules. The inter-module communication circuitry 2117 can alert the user when the overall capacity of the bank of power cell modules is low so that the user can recharge power cell modules or make other provisions for powering electronic appliances. In one embodiment, the users can install a dedicated power cell module system application on a personal computing device, such as a smart phone. The power cell module system application can enable the user to control or otherwise communicate with the power cell modules.

In one embodiment, when the power cell modules are connected in a bank of power cell modules, one of the power cell modules can be designated as the master power cell module. Users can be directed to connect electronic appliances to the master power cell module, the electronic appliances can then be powered by the entire bank of power cells via the master power cell. In one embodiment, the master power cell is substantially the same as the other power cell modules in the bank power cells. Alternatively, the master power cells can be a different type of power cell that includes additional connections and functionality.

In one embodiment, the power cell module 2102 includes a casing. The components of the power cell module one 2102 are positioned primarily within the casing. The display 2118 and the user power outputs 2114 can be positioned on an outer surface of the casing. The inter-module multi-voltage bus connectors 2112 can also be positioned, at least partially, and an outer surface of the casing. Inter-module data connection ports and other I/O ports can be positioned on the outer surface of the casing.

Those of skill in the art will recognize, in light of the present disclosure, that a power cell module 2102 in accordance with the present disclosure can include additional components, fewer components, or different combinations of components than are shown in FIG. 21, without departing from the scope of the present disclosure.

Figure 22:
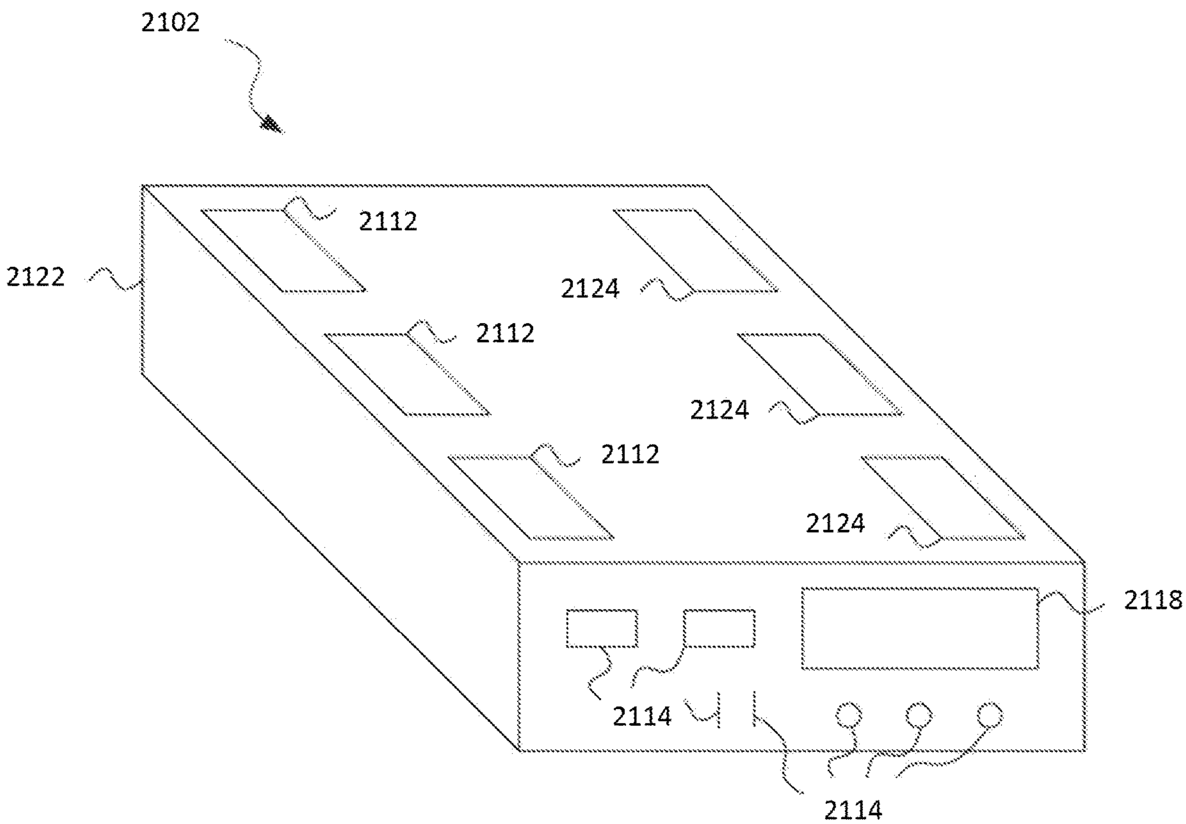
FIG. 22 is an illustration of a power cell module, in accordance with embodiments.

FIG. 22 is an illustration of a power cell module 2102, according to an embodiment. With reference to FIG. 21 and the descriptions above, the power cell module 2102 includes a casing 2122. The casing 2122 houses the batteries 2104*a*-2104*d*, the voltage combination circuitry 2106, the control circuitry 2110, the sensors 2116, the multi-voltage bus 2108, and other internal components of the power cell module 2102.

In one embodiment, the casing 2122 is formed of a durable material that can withstand the weight of several power cell module stacked on top of it. The material of the casing is also selected to withstand portable use of the power cell module 2102. The casing 2122 can include a hard and durable plastic, according to an embodiment.

In one embodiment, the inter-module multi-voltage bus connectors 2112 are positioned on the top surface of the power cell module 2102. Though not shown in FIG. 22, inter-module multi-voltage bus connectors 2112 are also positioned on a bottom surface of the power cell module 2102.

In one embodiment, when a power cell module is stacked on top of the power cell module 2102, the inter-module multi-voltage bus connectors 2112 on the top surface of the power cell module 2102 connect with inter-module multi-voltage bus connectors on a bottom surface of the other power cell module. The inter-module multi-voltage bus connectors 2112 ensure a secure electrical connection of the voltage lines of the output voltages of the multi-voltage bus 2108 of each of the power cell modules, forming a collective multi-voltage bus from all of the power cell modules in a stack. Additionally, though not shown, inter-module multi-voltage bus connectors 2112 can also be positioned on lateral surfaces of the power cell module 2102 to facilitate stacking or connecting power cell modules laterally as well as vertically.

In one embodiment, the inter-module multi-voltage bus connectors 2112 can include Anderson connectors. Additionally, or alternatively, the inter-module multi-voltage bus connectors 2112 can include other types of electrical connectors. Each inter-module multi-voltage bus connector 2112 can include a positive and a negative terminal for the corresponding output voltage. In one embodiment, the inter-module multi-voltage bus connectors 2112 can also include fasteners that securely fasten power cell module 2102 to the power cell module that is placed on top of the power cell module 2102, or on top of which the power cell module 2102 is placed, as the case may be.

In one embodiment, the power cell module 2102 also includes fasteners 2124 on the top and bottom surfaces of the power cell module 2102. The fasteners 2124 can assist in fastening the power cell module 2102 to a power cell module placed on top of the power cell module 2102 the fasteners 2124 can assist in fastening the power cell module to a power cell module placed on the bottom of the power cell module 2102.

In one embodiment, the power cell module 2102 also includes user power outputs 2114 on a front face of the power cell module 2102. User power outputs 2114 can also be positioned on other faces of the power cell module 2102. Users can connect electronic appliances to the user power outputs 2114 in order to power electronic appliances with the power cell module 2102, or with a stack of power cell modules.

In one embodiment, the power cell module 2102 can also include user input devices, not shown in FIG. 22. The user input devices can enable the user to input commands or otherwise control features of the power cell module 2102. The user input devices can include buttons, switches, sliders, knobs, keypads, touchscreens, or other devices by which users can input commands or control features of the power cell module 2102. In one embodiment, the user input devices include a power button that enables the user to turn the power cell module 2102 on or off.

In one embodiment, the power cell module can also include data ports, not shown in FIG. 22. The data ports can include connectors for reading data from or writing data to a memory within the power cell module 2102.

In one embodiment, the power cell module 2102 includes a display 2118. The display 2118 can display text, images, or animations. The user can read or view the text, images, or animations displayed by the display 2118.

Those of skill in the art will recognize, in light of the present disclosure, that the power cell module in accordance with principles of the present disclosure can have other shapes and configurations than that which is shown in FIG. 22, without departing from the scope of the present disclosure.

Figure 23:
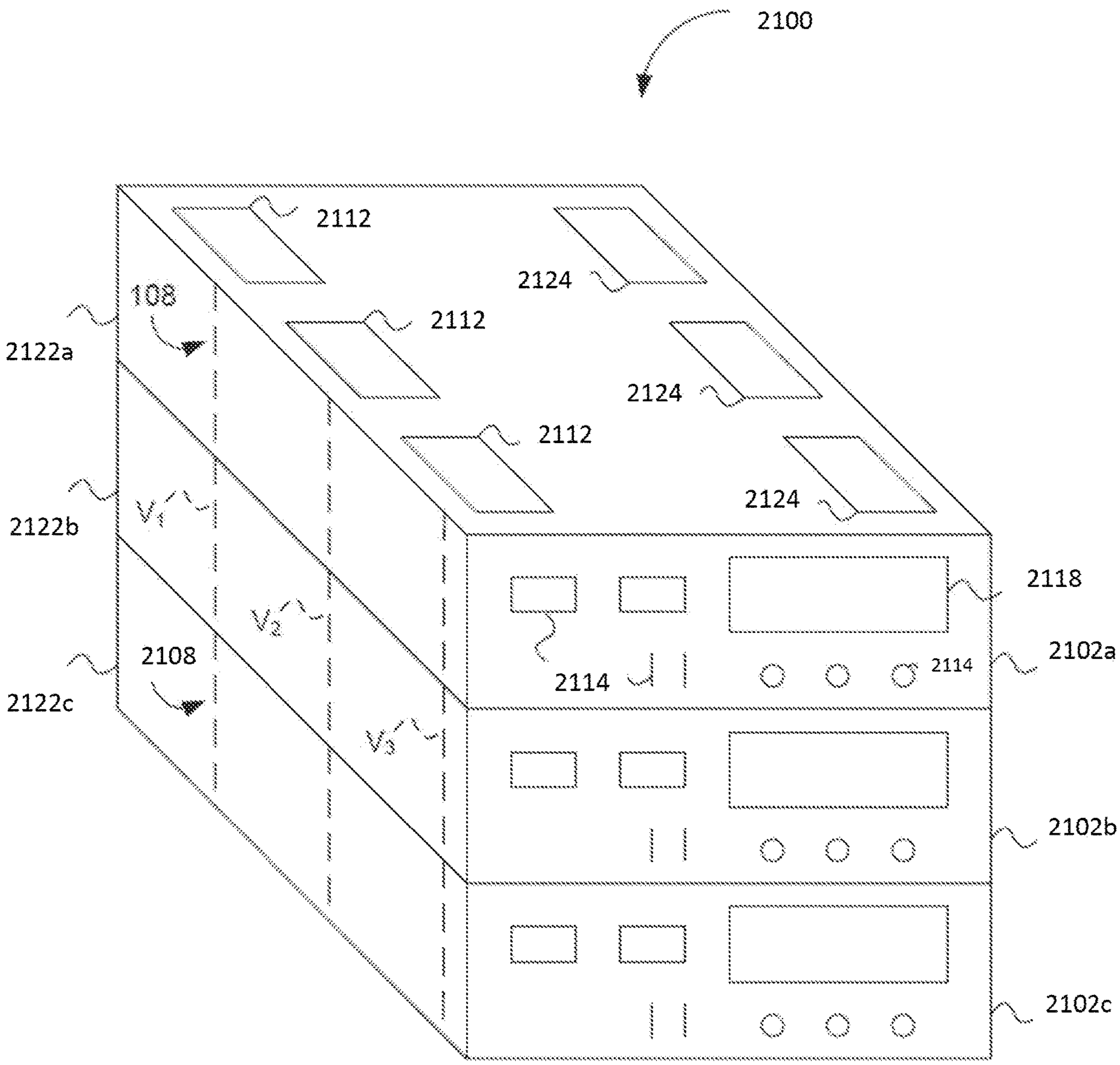
FIG. 23 is an illustration of a system including a bank of power cell modules, in accordance embodiments.

FIG. 23 illustrates a energy storage and supply system 2100 including a bank of power cell modules 2102*a*-2102*c*, according to one embodiment. With reference to the descriptions above, FIG. 23 illustrates three power cell modules 2102*a*-2102*c*. However, more or fewer power cell modules can be connected in a bank of power cell modules in accordance with principles of the present disclosure.

In one embodiment, each power cell module the bank of power cell modules is connected in such a manner that a collective multi-voltage bus 2108 is formed. The collective multi-voltage bus 2108 includes a voltage line for each output voltage V1-V3. The collective multi-voltage bus 2108 simultaneously carries each of the output voltages V1-V3.

In one embodiment, when an electronic appliance is connected to one of the user power outputs 2114 of one of the power cell modules 2102*a*-2102*c*, power is provided to the electronic appliance from each of the power cell modules 2102*a*-2102*c*. The voltage lines of the multi-voltage bus 2108 are shown as dashed lines internal to the casings 2122*a*-2122*c* of the power cell modules 2102*a*-2102*c*. While each output voltage is shown as having a single line, in practice, each output voltage has both a positive and a negative line defining the output voltage.

In one embodiment, each power cell in the system 2100 is substantially identical, having the same user power outputs 2114, the same display 2118, and possibly other identical features such as user inputs and data ports. In this case, power can be supplied by plugging an electronic appliance into the user power outputs 2114 of any of the connected power cell modules 2102*a*-2102*c*. Alternatively, one of the power cell modules can act as a master to the other power cell modules in the stack. In this case, the electronic appliances are connected to the user power outputs 2114 of the master power cell module. The master power cell module can be the top power cell module, as one example, or the bottom power cell module, as another example.

In one embodiment, the power cell modules 2102*a*-2102*c* are not identical to each other. Instead, some power cell modules may have more or fewer features, different arrangements of components, different numbers of components, different sizes, different power storage and supply capacities, or other types of differences. In this case, the inter-module multi-voltage bus connectors 2112 still ensure that each power cell module 2102*a*-2102*c* joins the multi-voltage bus 2108. In one embodiment, one of the multi-voltage power cells is a controlling or master multi-voltage power cell having additional features compared to the other power cell modules in the stack. Some power cell modules in the stack may be relatively featureless in that they do not have user power outputs 2114 and are only used to connected into the stack to provide additional energy capacity to the system 2100. Thus, the stack may include one or master or controlling power cell modules, and one or more simple or slave power cell modules that serve only to provide additional capacity the system 2100, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the Figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A modularized energy storage system, comprising:

a power cabinet configured to function as a primary power appliance and configured to provide a plurality of different output voltages; and a plurality of battery-based energy storage systems configured to supply stored energy to the power cabinet when connected to the power cabinet, wherein each of the plurality of battery-based energy storage systems is detachable from the power cabinet;

wherein the power cabinet comprises at least one DC/DC converter and an independent energy supply suitable for short duration power and energy supply; and wherein the power cabinet and the plurality of battery-based energy storage systems are configured for transportation on a vehicle, a water vessel or aircraft.

2. The modularized energy storage system of claim 1 wherein the power cabinet further comprises at least one of a DC-AC inverter, a transformer, a frequency regulator, and a plurality of inputs.

3. The modularized energy storage system of claim 1 wherein the power cabinet is controllable via a user interface, the user interface configured to receive input indicative of at least one selected energy input or at least one selected output voltage.

4. The modularized energy storage system of claim 1 wherein each of the plurality of battery-based energy storage systems are part of an electrically linked chain of a plurality of electrically linked chains, and wherein each electrically linked chain of the plurality of electrically linked chains is connected to the power cabinet.

5. The modularized energy storage system of claim 1 wherein the power cabinet comprises a combustion fuel system.

6. The modularized energy storage system of claim 1 wherein at least one of the battery-based energy storage systems of the plurality of battery-based energy storage systems is charged and at least one of the battery-based energy storage systems of the plurality of battery-based energy storage systems is depleted; and wherein the at least one charged battery-based energy storage system is configured to deliver power to the at least one depleted battery-based energy storage system.

7. The modularized energy storage system of claim 1 wherein the plurality of battery-based energy storage systems is configured to receive power from or deliver power to at least one of a solar panel, a wind turbine, or a renewable energy source.

8. The modularized energy storage system of claim 1 wherein each the plurality of battery-based energy storage systems is configured to be decoupled from the power cabinet.

9. The modularized energy storage system of claim 1, further comprising at least one additional power cabinet connected to the power cabinet, wherein the power cabinet is configured to provide multi-phase output voltages to the at least one additional power cabinet.

10. The modularized energy storage system of claim 1 wherein the power cabinet is further configured to draw power from one or more selected battery-based energy storage systems of the plurality of battery-based energy storage systems and to not draw power from one or more other battery-based energy storage systems of the plurality of battery-based energy storage systems.

11. The modularized energy storage system of claim 1 wherein the power cabinet includes means to draw power from a charged battery-based energy storage system and bypass a depleted battery-based energy storage system.

12. The modularized energy storage system of claim 1 wherein the power cabinet is configured to prioritize drawing power from renewable energy sources when available.

13. The modularized energy storage system of claim 1, further comprising a control system configured to monitor the state of charge of each of the plurality of battery-based energy storage systems and to control the charging and discharging of the battery-based energy storage systems based on the monitored state of charge.

14. The modularized energy storage system of claim 1 wherein the power cabinet is configured to supply power to a plurality of electric battery charging stations simultaneously.

15. The modularized energy storage system of claim 1 wherein at least one power cabinet configured as a traction or motive appliance utilizes the following method:

providing a power cabinet configured to function as a primary power appliance and to provide a plurality of different output voltages;

connecting a plurality of battery-based energy storage systems to the power cabinet, wherein each of the battery-based energy storage systems is detachable from the power cabinet;

transporting the power cabinet and the plurality of battery-based energy storage systems on a vehicle to a location proximate to a charging station; and supplying power from the power cabinet to the charging station to charge an electric battery;

wherein the modularized energy storage system is capable of mobility and to transmit or receive electrical energy from a second power cabinet of a second modularized energy storage system.

16. The modularized energy storage system of claim 1, further comprising at least one additional power generating device connected to the power cabinet, wherein the power cabinet is configured to provide multi-phase output voltages to establish an AC waveform such that the power generating device can operate in a grid-connected operation.

17. A method for charging an electric battery using a modularized energy storage system, the method comprising:

providing a power cabinet configured to function as a primary power appliance and to provide a plurality of different output voltages;

connecting a plurality of battery-based energy storage systems to the power cabinet, wherein each of the battery-based energy storage systems is detachable from the power cabinet;

transporting the power cabinet and the plurality of battery-based energy storage systems on a vehicle to a location proximate to a charging station; and supplying power from the power cabinet to the charging station to charge an electric battery.

18. The method of claim 17, further comprising:

monitoring a state of charge of each of the plurality of battery-based energy storage systems; and selectively connecting or disconnecting individual battery-based energy storage systems from the power cabinet based on the monitored state of charge.

19. The method of claim 17 wherein supplying power from the power cabinet to the charging station comprises:

converting a DC voltage from the plurality of battery-based energy storage systems to an AC voltage using a DC-AC inverter in the power cabinet; and supplying the AC voltage to the electric vehicle charging station.

20. The method of claim 19 wherein an additional or secondary power-generating device is not enabled or capable of tracking and following an AC waveform such that the combination of the sinusoidal frequencies match and operate together, but instead the primary power cabinet can accept the secondary-power-generating-device power and transform it to immediate load or store it.

21. A mobile electric vehicle charging system, comprising:

a modularized energy storage system including a power cabinet configured to function as a primary power appliance and to provide a plurality of different output voltages; and a plurality of battery-based energy storage systems configured to supply stored energy to the power cabinet, wherein each of the plurality of battery-based energy storage systems is detachable from the power cabinet;

wherein the power cabinet and the plurality of battery-based energy storage systems are configured for transportation on a vehicle to a location proximate to an electric vehicle charging station; and wherein the power cabinet is configured to supply power to the electric vehicle charging station to charge an electric vehicle.

22. The mobile electric vehicle charging system of claim 21 wherein the electric vehicle is an electric truck.

23. The mobile electric vehicle charging system of claim 21 wherein the power cabinet further comprises a DC-AC inverter configured to convert a DC voltage from the plurality of battery-based energy storage systems to an AC voltage for supplying to the electric vehicle charging station.

24. The mobile electric vehicle charging system of claim 21 wherein the electric vehicle comprises a watercraft, vessel, aircraft, bus, or motorcycle.

25. A method for charging an electric vehicle using a mobile modularized energy storage system, the method comprising:

providing a modularized energy storage system including a power cabinet and a plurality of battery-based energy storage systems, wherein the power cabinet is configured to function as a primary power appliance and to provide a plurality of different output voltages, and wherein each of the battery-based energy storage systems is detachable from the power cabinet;

transporting the modularized energy storage system on a vehicle to a location proximate to an electric vehicle charging station;

connecting the power cabinet to the electric vehicle charging station; and supplying power from the power cabinet to the electric vehicle charging station to charge an electric vehicle.

26. The method of claim 25 wherein the electric vehicle is an electric truck.

27. The method of claim 25, further comprising:

converting, using a DC-AC inverter in the power cabinet, a DC voltage from the plurality of battery-based energy storage systems to an AC voltage; and supplying the AC voltage to the electric vehicle charging station to charge the electric vehicle.

* * * * *